US012621169B2

(12) United States Patent
Konda et al.

(10) Patent No.: US 12,621,169 B2
(45) Date of Patent: *May 5, 2026

(54) SECURE ATTESTATION OF ENDPOINT CAPABILITY

(71) Applicant: McAfee, LLC, San Jose, CA (US)

(72) Inventors: Tirumaleswar Reddy Konda, Bangalore (IN); Shashank Jain, Bangalore (IN); Piyush Pramod Joshi, Aurangabad (IN); Himanshu Srivastava, Bangalore (IN)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,476

(22) Filed: Feb. 26, 2024

(65) Prior Publication Data

US 2024/0205028 A1    Jun. 20, 2024

Related U.S. Application Data

(63) Continuation of application No. 17/219,411, filed on Mar. 31, 2021, now Pat. No. 11,917,080.

(51) Int. Cl.

| | |
|---|---|
| *G06F 21/57* | (2013.01) |
| *H04L 9/08* | (2006.01) |
| *H04L 9/32* | (2006.01) |
| *H04L 9/40* | (2022.01) |
| *H04L 12/66* | (2006.01) |
| *H04W 12/069* | (2021.01) |

(52) U.S. Cl.
CPC ............ *H04L 9/3268* (2013.01); *G06F 21/57* (2013.01); *H04L 9/0891* (2013.01); *H04L*

*12/66* (2013.01); *H04L 63/20* (2013.01); *H04W 12/069* (2021.01); *H04L 63/0823* (2013.01)

(58) Field of Classification Search
CPC ...... G06F 21/57; H04L 63/20; H04L 63/0823
See application file for complete search history.

(56) References Cited

U.S. PATENT DOCUMENTS

| | | | | |
|---|---|---|---|---|
| 9,294,456 | B1 * | 3/2016 | Timmermans | ........ H04L 63/083 |
| 10,574,653 | B1 * | 2/2020 | Karppanen | ............. G06F 21/52 |
| 11,917,080 | B2 * | 2/2024 | Konda | .................... G06F 21/57 |
| 2016/0057114 | A1 * | 2/2016 | Unagami | .............. H04W 12/08 |
| | | | | 713/171 |
| 2017/0180316 | A1 * | 6/2017 | Teng | ..................... H04L 63/105 |
| 2017/0324733 | A1 * | 11/2017 | Howry | ................. H04W 12/50 |
| 2017/0339190 | A1 * | 11/2017 | Epstein | ............... H04L 63/1433 |
| 2019/0306166 | A1 * | 10/2019 | Konda | .................. H04W 12/73 |

(Continued)

OTHER PUBLICATIONS

Menezes et al.—"Handbook of Applied Cryptography" 1997 CRC Press Chapter 13 (Year: 1997).*

*Primary Examiner* — David J Pearson

(74) *Attorney, Agent, or Firm* — PATENT CAPITAL GROUP

(57)    ABSTRACT

There is disclosed a system and method of providing services on a home gateway, including providing a set of security scans for traffic to and from a plurality of devices on a home network; cryptographically verifying that a secured device from the plurality of devices provides for itself internal security services; and based on the cryptographic verification, skipping at least one security scan of the set of security scans for traffic of the secured device.

20 Claims, 15 Drawing Sheets

(56)          References Cited

U.S. PATENT DOCUMENTS

| | | | | |
|---|---|---|---|---|
| 2019/0354709 | A1* | 11/2019 | Brinskelle | ............... G06F 21/31 |
| 2020/0322382 | A1* | 10/2020 | Wang | .................. H04L 63/1408 |
| 2020/0396259 | A1* | 12/2020 | Schory | .................. H04L 63/105 |
| 2021/0099481 | A1* | 4/2021 | Mallis | ..................... H04L 63/02 |
| 2022/0201044 | A1* | 6/2022 | Willis | ..................... H04L 63/20 |

* cited by examiner

600

SECURE ATTESTATION OF ENDPOINT CAPABILITY

CROSS REFERENCE TO RELATED APPLICATION

This application claims priority to U.S. patent application Ser. No. 17/219,411, titled "Secure Attestation of Endpoint Capability," filed on 31 Mar. 2021, which is incorporated herein by reference in its entirety.

FIELD OF THE SPECIFICATION

This application relates in general to computer security, and more particularly, though not exclusively, to a system and method of providing secure attestation of endpoint capability.

BACKGROUND

Home routers (e.g., for families) and enterprise gateway devices may collectively be referred to as a "home gateway." The home gateway provides a home network for an endpoint, which may be the network that the endpoint is most commonly connected to, i.e., at a "home" location. In some cases, the home gateway provides network security services, such as packet scanning or similar.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
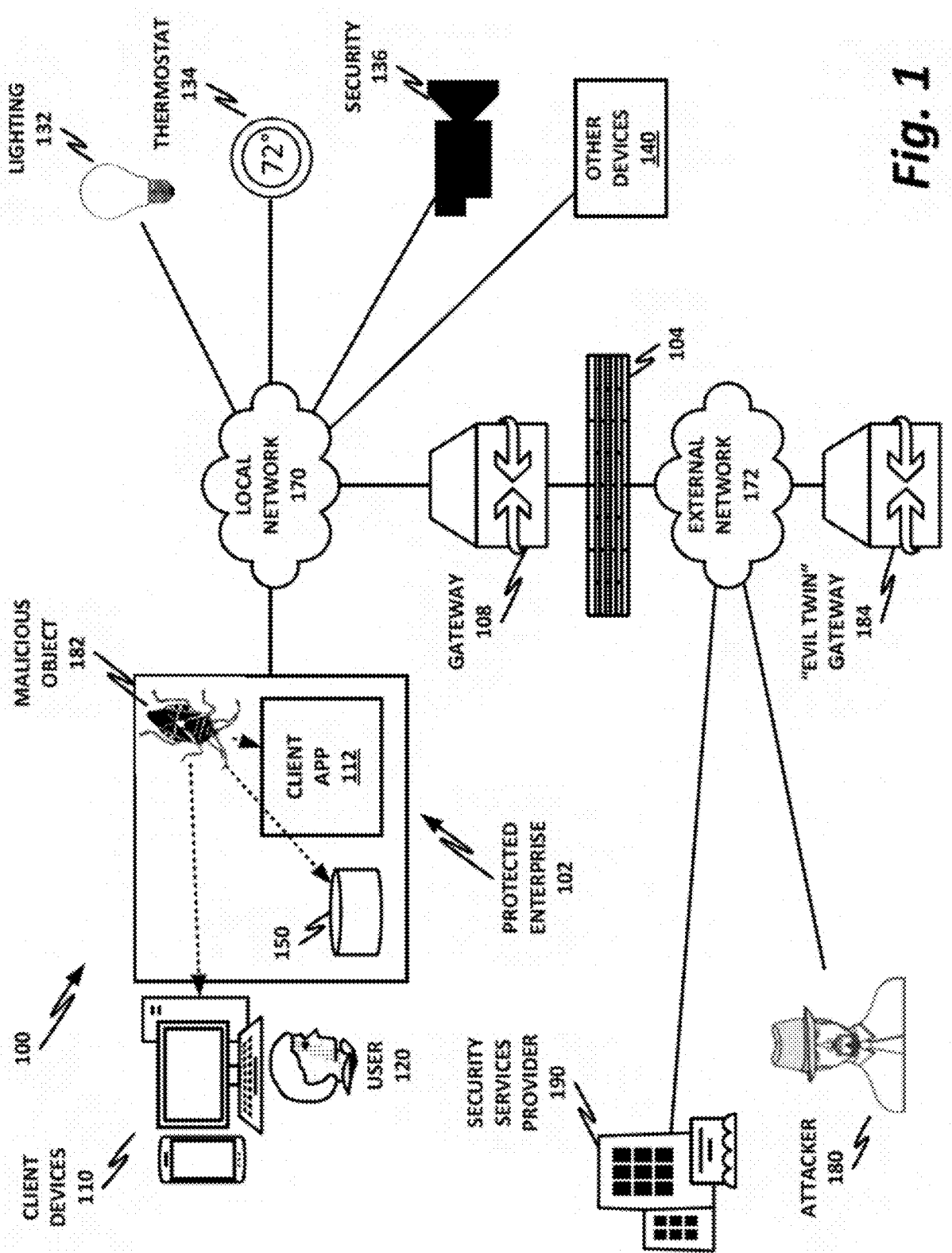
FIG. 1 is a block diagram of selected elements of a home network.

There is disclosed a system and method of providing services on a home gateway, including providing a set of security scans for traffic to and from a plurality of devices on a home network; cryptographically verifying that a secured device from the plurality of devices provides for itself internal security services; and based on the cryptographic verification, skipping at least one security scan of the set of security scans for traffic of the secured device.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Many vendors provide home gateway devices for individuals, families, enterprises, and other organizations. For example, MCAFEE, LLC's Secure Home Platform (SHP) provides a secure home gateway for families and individuals, while MCAFEE, LLC also provides a number of enterprise-class home gateways for larger concerns. The network security services could include, for example, packet scanning, deep packet inspection, routing, forwarding, antivirus and anti-malware services, reputation-based security (including URL reputation security), and others.

In some cases, a home gateway may operate in a relatively constrained computational environment. For example, family or individual-oriented home gateways such as SHP may commonly run on an application-specific integrated circuit (ASIC) with limited memory, and with a relatively limited set of instructions stored on a read-only memory (ROM). While it is possible to provide a home gateway with much greater computational abilities—and indeed, in the enterprise context, sometimes much more processing power is provided via dedicated network appliances and/or network function virtualization—pragmatic and economic considerations often dictate the capabilities of smaller home gateway devices. Thus, a home gateway device with limited processing capabilities may have the necessary code (e.g., in firmware) to perform a host of useful network functions, but it may lack the processing bandwidth to perform those functions on every packet or flow for every device connected to the home network.

This situation is increasingly true as the internet of things (IoT) increases at a nearly exponential rate, with many devices now being connected to home networks. While in the past, a home network may have had to handle only a small number of personal computers, a modern home network may need to handle traffic for personal computers (PCs), laptops, tablets, phones, smart TVs, smart appliances, and many other devices connected to a network. This can be computationally intensive, and may exceed the capabilities of common home gateway devices, particularly those for individuals and families.

It is therefore advantageous for a home gateway to cryptographically determine if an endpoint device has an appropriate security agent, such as an antivirus agent, an anti-malware agent, or other agent that performs some or all of the functions that could be provided by the home gateway. Assuming that the security agent is trusted, then the home gateway may elect to bypass certain services, especially resource intensive services like deep packet inspection (DPI), for flows originating from those secure endpoints.

In some existing solutions, a home gateway may use domain names resolved by the endpoint to determine whether the endpoint has a host security agent. For example, a home gateway could use resolved domain names to determine whether an endpoint is running a client provided by MCAFEE, LLC such as McAfee Mobile Security (MMS), McAfee Antivirus, McAfee Total Security, McAfee LiveSafe, or some other service. The home gateway may have a database of known and trusted security agents, including the capabilities of each, and may use the resolved domain names from the endpoint to determine which security agent or agents are installed on the endpoint. It may then use this information to determine a security policy to apply to packets or flows for that endpoint, which could, for example, include bypassing, deferring, or limiting certain services, especially resource intensive services such as DPI or similar. These services can be bypassed or limited on the assumption that an endpoint device running an appropriate security agent can perform the services on its own packets and flows, using the compute resources of the endpoint, which advantageously are dedicated to the endpoint and which may be greater than those available on the home gateway.

But the method of using resolved domain names is vulnerable, and is based on a weak inference that can easily be mimicked by a malicious object to create the false impression that a host security agent is installed and active on the endpoint. Thus, certain services are bypassed on the home gateway, and the malicious agent can do its work with less or no interference from the home gateway.

Furthermore, wireless local area networks (LANS), such as those deployed in home environments, are vulnerable to attacks like the evil twin attack, which can be exploited to launch attacks on the endpoint. For example, in an evil twin attack, a malicious wireless access point (WAP) masquerades as a legitimate WAP by broadcasting the same service set identifier (SSID) as a legitimate WAP. The evil twin WAP can then allow endpoints to connect to it, and can monitor, snoop, redirect, or otherwise have control over network flows of those endpoints. This can be used to launch attacks on the endpoint, such as by misguiding the user to visit phishing websites, or by not blocking access to malicious domains. It could also be used to eavesdrop on wireless communications, or to adversely impact the privacy of the endpoint. Detecting an evil twin attack in a home network is nontrivial, and may require changes to the way Wi-Fi authentication happens in home networks.

The present specification teaches a system and method to cryptographically attest the security status of a device to the home gateway. The home gateway can use this attestation to securely and deterministically access the security posture of the device. This can include, for example, the operating system version, installed applications, browser extensions enabled, host security agent, capabilities of the host security agent, and any other desired attribute. This allows the home gateway to determine whether traffic from the device requires deeper network analysis or not. For example, this may inform the home gateway of potential vulnerabilities on the endpoint, and may also inform the home gateway of whether the endpoint has a host security agent that can handle these threats without intervention by the home gateway. This certification can be done via an exchange of certificates, with the home gateway providing a server certificate, and the endpoint providing an endpoint certificate. The home gateway may use, for example, a root certificate to authenticate the client or endpoint certificate, while the endpoint may query a certificate authority to authenticate the server certificate.

Furthermore, the endpoint device may build a data structure such as a "security posture assessment token" (SPAT), which may be any data structure that is used to attest the security posture and capabilities of the endpoint. The endpoint may have a trusted execution environment (TEE), and may import the SPAT into the TEE, where it may be signed via a private key of the endpoint. The endpoint can then export the SPAT out of the TEE, and send the SPAT to the home gateway, which can verify the SPAT via the endpoint's public endpoint certificate. This provides a secure attestation of capability. On the reverse side, because the endpoint can securely validate the home gateway, the endpoint can avoid evil twin attacks.

Enterprises may include home gateways with greater capabilities, such as high-end switches, dedicated hardware network appliances, and/or network function virtualization (NFV) infrastructure that provides much greater capability to the enterprise. However, the teachings of this specification can also benefit highly capable enterprise devices, such as those described.

As "bring your own device" (BYOD) becomes more popular and prevalent in enterprises, more and more personal devices are showing up on enterprise networks. Employees use these devices to access enterprise resources and applications to do their work. Because employees are using personal devices to access internal resources, mobile device management (MDM) and functions associated with MDM are becoming increasingly important to protecting devices and enforcing enterprise policies.

However, many users maintain or wish to maintain privacy and personal data sovereignty. These desires can clash with the employer's need to install MDM on the user's personal device. Users may be concerned that an administrator can glean personal, non-enterprise related information from MDM-controlled devices. Enterprise administrators may also be able to control how users use their devices. This can inhibit users' willingness to participate in the BYOD paradigm, which can create difficulties for both the enterprise and the user. On the enterprise side, this may mean that the enterprise is required to provide and maintain individual devices for each user, while for the user it may mean carrying multiple laptops, tablets, cell phones, or other devices. But without MDM, enterprise information technology (IT) administrators may not have visibility into the security posture of the user devices. Furthermore, MDM is not a viable option in some enterprise network solutions such as server message block (SMB), or for schools and universities. MDM may also not be a viable option for a consultant or contractor working for multiple organizations.

The teachings of the present specification can advantageously provide secure attestation of the security posture of an endpoint device such as a BYOD apparatus, using a nonintrusive onboarding mechanism to cryptographically attest the security status of the device. The device security posture can be cryptographically attested on an open or closed operating system to an enterprise security management platform, such as ePolicy Orchestrator provided by MCAFEE, LLC, or similar. This can be used to authorize access on internal resources. Some embodiments are limited to closed operating systems like Apple iOS and Windows 10 S. Other embodiments may be provided that work on open operating systems such as Windows 10, Linux, or other similar operating systems, provided those devices have a trusted platform module (TPM), or other similar TEE hardware capabilities.

It is advantageous for the home gateway—whether it be enterprise, personal, family, or other—to know with high confidence the security posture of devices in the network. This provides an ability for security applications running on the home gateway to craft individual network security policies for endpoint devices. This not only helps to provide appropriate access to devices, networks, and services, but also helps to determine the amount of scrutiny required on traffic generated by, or received on, these devices.

The teachings of the present specification provide novel techniques for endpoints to dynamically generate a cryptographic attestation token that indicates the security posture of the device. The endpoint can securely send this cryptographically verifiable security token to network security services.

In individual and home deployments, an endpoint security application such as a host security agent may optionally provide a thin agent (for closed operating system devices) on the endpoint. This thin agent can assess the security posture of the device. The security posture may contain various parameters like the operating system version, applications/extensions installed, and similar. The assessed posture may then be signed using the client certificate's private key in a TEE to generate the SPAT. The client certificate can be obtained by the host security agent, for example, via enrollment over secure transport (EST). This can be done, for example, via onboarding, and the private key of the client certificate may be stored in the TEE. Once a SPAT is generated, it can be communicated to the home gateway via a mutually authenticated peer-to-peer (P2P) communication over transport layer security (TLS).

This TLS-based P2P mutual authentication may have other benefits. For example, in addition to sending the SPAT, a security application can store a fingerprint of the home gateway's certificate, along with the Wi-Fi service set identifier/basic server set identifier (SSID:BSSID). This fingerprint can be used to detect an evil twin attack, even before a trusted connection to a certificate authority is established.

On receiving the SPAT token, the home gateway may cryptographically assert the attested security posture of the endpoint, and then allow specific access or privileges, or enforce specific policies for the endpoint, based on the SPAT. For example, if the assessed security posture of the device is above a threshold, such as the endpoint is running a closed operating system, and all installed applications and extensions are of a good reputation, then the home gateway may choose to skip certain services such as DPI on traffic generated by, or received for, this endpoint.

The teachings of this specification can also be used in an enterprise setup for a closed operating system BYOD device. For example, the user may install a thin agent that is not privacy intrusive, and that is provided by the enterprise. The thin agent may be installed from a trusted store, and a profile is provided to enable connection with the enterprise network. The thin agent may generate the SPAT token and sign it using the same mechanism described above. Once a connection is established with the enterprise network, the thin agent may send the signed SPAT to a security management platform, such as a policy orchestrator like ePolicy Orchestrator provided by MCAFEE, LLC. This can be done via an authenticated P2P communication over TLS. Using this solution, the security management platform can access the security posture of the endpoint without installing MDM software. Based on this security posture, the enterprise may then grant appropriate access to the device. This solution also enables security management platforms to notify users about applications with bad reputations or malicious apps on the BYOD devices, and can force uninstallation of such apps before granting access.

In the case of open operating systems such as Android, Linux, or Windows (not Windows 10 S), certain advantages may still be realized in the case that the device has a TPM or other TEE-capable hardware. In that case, although the enterprise has less control over the device, the TEE can still be used to attest the security posture of the device, including whether the device has an appropriate security agent installed. The SPAT for an open operating system device may still include a list of installed applications or agents, and may still provide secure means for accessing enterprise resources, even though the enterprise has less control over the device.

The solution of the present specification provides advantages over existing solutions that may use, for example, domain name system (DNS)-based inferences to determine the presence of an antivirus agent on the endpoint. DNS-based inference and other weak inferences are spoofable by a malicious entity. In contrast, the solution disclosed in this specification provides a more secure and robust approach for the home gateway to reliably determine the security posture of the endpoint device, including, for example, the presence of an antivirus application, the use of a closed operating system, or similar.

In the enterprise context, this solution provides advantages over solutions that require an MDM to be installed on the employee's personal BYOD device. In the absence of an MDM application, BYOD devices or contractor devices may not be allowed to connect to enterprise networks, or to access enterprise resources. While the purpose of these policies may be to prevent accidental resource leakages, the privacy policies around them may feel intrusive to end users. Many users have concerns over privacy and personal data sovereignty when employers install MDM on their personal devices. They may be concerned, for example, that an administrator can glean personal information and control how the users operate their devices. The solution eliminates the need for an MDM application on a closed OS device, or the need to install any endpoint control software. Thus, the enterprise need not absolutely control the user's device to provide a secure data environment.

The foregoing can be used to build or embody several example implementations, according to the teachings of the present specification. Some example implementations are included here as nonlimiting illustrations of these teachings.

There is disclosed in one example a network gateway device, comprising: a hardware platform comprising a processor and a memory; a network interface, including network interface hardware; and instructions encoded within the memory to instruct the processor to: receive from an endpoint device, via the network interface, a signed security posture data structure, the signed security posture data structure comprising information about a security posture of the endpoint device; cryptographically verify the signed security posture data structure; and according to the signed security posture data structure, assign a network security policy to the endpoint device.

There is further disclosed an example network gateway device, wherein the instructions are further to provision a server certificate for the gateway, and to authenticate the gateway to the endpoint device via the server certificate.

There is further disclosed an example network gateway device, wherein the instructions are further to make a provisional secure connection with the endpoint device, wherein authenticating the gateway to the endpoint device comprises sending the server certificate to the endpoint device via the provisional secure connection.

There is further disclosed an example network gateway device, wherein provisioning the server certificate comprises procuring the server certificate from a certificate authority.

There is further disclosed an example network gateway device, wherein the instructions are further to provision a root certificate for the gateway.

There is further disclosed an example network gateway device, wherein provisioning the root certificate comprises procuring the root certificate from a certificate authority.

There is further disclosed an example network gateway device, wherein cryptographically verifying the signed security posture data structure comprises validating via an endpoint certificate provided by the endpoint device, and verifying the endpoint certificate via the root certificate.

There is further disclosed an example network gateway device, wherein the instructions are further to verify the endpoint certificate via an enrollment over secure transport (EST) provider.

There is further disclosed an example network gateway device, wherein the EST provider is one of a plurality of EST providers, and wherein verifying the endpoint certificate via the EST provider comprises querying a distributed append-only log.

There is further disclosed an example network gateway device, wherein the instructions are further to make a non-provisional secure connection to the endpoint device after cryptographically verifying the signed security posture data structure.

There is further disclosed an example network gateway device, wherein the network security policy comprises limited network traffic processing if the signed security posture data structure indicates that the endpoint device has a security agent that meets a minimum acceptable security requirement.

There is further disclosed an example network gateway device, wherein the instructions are further to determine that the endpoint device has failed to provide a signed security posture data structure, and to apply a strict security policy to the endpoint device.

There is further disclosed an example network gateway device, wherein the instructions are further to provide network gateway services.

There is further disclosed an example network gateway device, wherein the network interface hardware comprises a Wi-Fi transceiver, and wherein the instructions are to provide a wireless access point (WAP).

There is also disclosed an example of one or more tangible, non-transitory computer-readable storage media having stored thereon executable instructions to provide a network gateway, the instructions to: communicatively couple to a network via a network interface; identify an endpoint device of the network; securely receive from the endpoint device a security posture assessment token (SPAT), the SPAT comprising a data structure including information about capabilities of the endpoint device; cryptographically verify that the SPAT was signed by an authorized key of the endpoint device; and assign to the endpoint device a network security policy according to content of the SPAT.

There is further disclosed an example of one or more tangible, non-transitory computer-readable media, wherein the instructions are further to provision a server certificate for the gateway, and to authenticate the gateway to the endpoint device via the server certificate.

There is further disclosed an example of one or more tangible, non-transitory computer-readable media, wherein the instructions are further to make a provisional secure connection with the endpoint device, wherein authenticating the gateway to the endpoint device comprises sending the server certificate to the endpoint device via the provisional secure connection.

There is further disclosed an example of one or more tangible, non-transitory computer-readable media, wherein provisioning the server certificate comprises procuring the server certificate from a certificate authority.

There is further disclosed an example of one or more tangible, non-transitory computer-readable media, wherein the instructions are further to provision a root certificate for the gateway.

There is further disclosed an example of one or more tangible, non-transitory computer-readable media, wherein provisioning the root certificate comprises procuring the root certificate from a certificate authority.

There is further disclosed an example of one or more tangible, non-transitory computer-readable media, wherein cryptographically verifying that the SPAT was signed by an authorized key of the endpoint device comprises validating via an endpoint certificate provided by the endpoint device, and verifying the endpoint certificate via the root certificate.

There is further disclosed an example of one or more tangible, non-transitory computer-readable media, wherein the instructions are further to verify the endpoint certificate via an enrollment over secure transport (EST) provider.

There is further disclosed an example of one or more tangible, non-transitory computer-readable media, wherein the EST provider is one of a plurality of EST providers, and wherein verifying the endpoint certificate via the EST provider comprises querying a distributed append-only log.

There is further disclosed an example of one or more tangible, non-transitory computer-readable media, wherein the instructions are further to make a non-provisional secure connection to the endpoint device after cryptographically verifying that the SPAT was signed by an authorized key of the endpoint device.

There is further disclosed an example of one or more tangible, non-transitory computer-readable media, wherein the network security policy comprises limited network traffic processing if the data structure indicates that the endpoint device has a security agent that meets a minimum acceptable security requirement.

There is further disclosed an example of one or more tangible, non-transitory computer-readable media, wherein the instructions are further to determine that the endpoint device has failed to provide a signed security posture data structure, and to apply a strict security policy to the endpoint device.

There is further disclosed an example of one or more tangible, non-transitory computer-readable media, wherein the instructions are further to provide network gateway services.

There is further disclosed an example of one or more tangible, non-transitory computer-readable media, wherein the network interface comprises a WiFi transceiver, and wherein the instructions are to provide a wireless access point (WAP).

There is also disclosed an example computer-implemented method of providing a gateway, comprising: provisioning a server certificate and root certificate for the gateway; identifying, via a local network interface, a network endpoint device; negotiating an authentication of the endpoint device, comprising sending the server certificate and receiving an endpoint certificate; receiving from the endpoint device an endpoint security token, the endpoint security token signed by the same or a different endpoint certificate, and including information about an installed security agent of the endpoint device; verifying the same or different endpoint certificate via the root certificate; and after verifying the same or different endpoint certificate, applying a network traffic processing policy to the endpoint device according to the endpoint security token.

There is further disclosed an example method, further comprising authenticating the gateway to the endpoint device via the server certificate.

There is further disclosed an example method, further comprising initiating a provisional secure connection with the endpoint device, wherein authenticating the gateway to the endpoint device comprises sending the server certificate to the endpoint device via the provisional secure connection.

There is further disclosed an example method, further comprising procuring the server certificate from a certificate authority.

There is further disclosed an example method, wherein provisioning the server certificate comprises procuring the server certificate from a certificate authority.

There is further disclosed an example method, wherein verifying the same or different endpoint certificate comprises validating via an endpoint certificate provided by the endpoint device, and verifying the endpoint certificate via the root certificate.

There is further disclosed an example method, further comprising verifying the endpoint certificate via an enrollment over secure transport (EST) provider.

There is further disclosed an example method, wherein the EST provider is one of a plurality of EST providers, and wherein verifying the endpoint certificate via the EST provider comprises querying a distributed append-only log.

There is further disclosed an example method, further comprising initiating a non-provisional secure connection to the endpoint device after verifying the same or different endpoint certificate.

There is further disclosed an example method, wherein the network traffic processing policy is limited if the endpoint security token indicates that the endpoint device has a security agent that meets a minimum acceptable security requirement.

There is further disclosed an example method, further comprising determining that the endpoint device has failed to provide a signed security posture data structure, and to apply a strict security policy to the endpoint device.

There is further disclosed an example method, further comprising providing network gateway services.

There is further disclosed an example method, further comprising providing a wireless access point (WAP), wherein the local network interface comprises a WiFi transceiver.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

There is also disclosed an example endpoint device, comprising: a hardware platform comprising a processor and a memory; a network interface; a trusted execution environment (TEE); an operating system; security agent software; and instructions encoded within the memory to instruct the processor to: receive from a certificate authority an endpoint certificate; store a private key for the endpoint certificate in the TEE; enumerate capabilities of the endpoint device; create a security posture data structure according to the enumerated capabilities; sign the security posture data structure with the private key; detect an advertised gateway; provisionally connect to the gateway; negotiate a mutual authentication with the gateway; and provide the signed security posture data structure to the gateway.

There is further disclosed an example endpoint device, wherein the instructions are further to connect to the gateway only after successful mutual authentication.

There is further disclosed an example endpoint device, wherein the gateway is a wireless access point (WAP).

There is further disclosed an example endpoint device, wherein the instructions are further to connect to the WAP only if the mutual authentication is successful, and the WAP has an unexpired server certificate.

There is further disclosed an example endpoint device, wherein receiving from the certificate authority the endpoint certificate comprises enrollment over secure transport (EST).

There is further disclosed an example endpoint device, wherein the operating system is an open operating system.

There is further disclosed an example endpoint device, wherein the operating system is a closed operating system.

There is further disclosed an example endpoint device, wherein the security agent software is a thin agent.

There is further disclosed an example endpoint device, wherein the security agent software comprises a userspace application.

There is further disclosed an example endpoint device, wherein the security agent software comprises a web browser extension.

There is also disclosed an example of one or more tangible, non-transitory computer-readable storage media having stored thereon executable instructions to: detect an available gateway; form a provisional connection with the gateway; securely perform a mutual authentication, comprising receiving a server certificate from the gateway; verify that the server certificate is authentic and not expired; and after verifying, form a non-provisional secure connection with the gateway.

There is further disclosed an example of one or more tangible, non-transitory computer-readable media, wherein the instructions are further to connect to the gateway only after successful mutual authentication.

There is further disclosed an example of one or more tangible, non-transitory computer-readable media, wherein the gateway is a wireless access point (WAP).

There is further disclosed an example of one or more tangible, non-transitory computer-readable media, wherein the instructions are further to connect to the WAP only if the mutual authentication is successful, and the WAP has an unexpired server certificate.

There is further disclosed an example of one or more tangible, non-transitory computer-readable media, wherein receiving the server certificate comprises enrollment over secure transport (EST).

There is further disclosed an example of one or more tangible, non-transitory computer-readable media, wherein the instructions are to execute on an open operating system.

There is further disclosed an example of one or more tangible, non-transitory computer-readable media, wherein the instructions are to execute on a closed operating system.

There is further disclosed an example of one or more tangible, non-transitory computer-readable media, wherein the instructions are to provide a thin agent.

There is further disclosed an example of one or more tangible, non-transitory computer-readable media, wherein the instructions are to provide a userspace application.

There is further disclosed an example of one or more tangible, non-transitory computer-readable media, wherein the instructions are to provide a web browser extension.

There is also disclosed an example of one or more tangible, non-transitory computer-readable storage media having stored thereon executable instructions to: provision a memory enclave within a trusted execution environment (TEE); store within the TEE a private key for an endpoint certificate; determine security capabilities of a security agent; generate a security status report of the security capabilities; sign the security status report with the private key; connect to a gateway; and send the security signed security status report to the gateway.

There is disclosed in yet another example, a method of providing services on a home gateway, comprising: providing a set of security scans for traffic to and from a plurality of devices on a home network; cryptographically verifying that a secured device from the plurality of devices provides for itself internal security services; and based on the cryptographic verification, skipping at least one security scan of the set of security scans for traffic of the secured device.

There is further disclosed an example, further comprising receiving a home gateway certificate from a certificate authority, and using the home gateway certificate in cryptographically verifying that the secured device provides for itself internal security services.

There is further disclosed an example, wherein using the home gateway certificate comprises authenticating the home gateway with the secured device via the home gateway certificate.

There is further disclosed an example, wherein using the home gateway certificate comprises making a provisional secure connection with the secured device, and sending the home gateway certificate via the provisional secure connection.

There is further disclosed an example, further comprising provisioning a root certificate for the home gateway.

There is further disclosed an example, further comprising provisioning an endpoint certificate to the secured device, wherein cryptographically verifying comprises authenticating the endpoint certificate against the root certificate.

There is further disclosed an example, wherein cryptographically verifying comprises performing a certificate exchange between the home gateway and the secured device.

There is further disclosed an example, wherein cryptographically verifying comprises receiving an attested security capability report from the secured device, and verifying the attested security capability report.

There is further disclosed an example, wherein cryptographically verifying comprises verifying that the secured device includes a trusted software security agent.

There is further disclosed an example, wherein cryptographically verifying comprises verifying that the secured device includes a minimum operating system version.

There is further disclosed an example, wherein cryptographically verifying comprises verifying that the secured device includes a trusted browser extension.

There is further disclosed an example, further comprising provisioning an endpoint certificate to the secured device via enrollment over secure transport (EST).

There is further disclosed an example, further comprising providing gateway routing via the home gateway.

There is further disclosed an example, further comprising providing wireless access point (WAP) services routing via the home gateway.

There is further disclosed an example of an apparatus comprising means for performing the method.

There is further disclosed an example, wherein the means for performing the method comprise a processor and a memory.

There is further disclosed an example, wherein the memory comprises machine-readable instructions that, when executed, cause the apparatus to perform the method.

There is further disclosed an example, wherein the apparatus is a computing system.

There is further disclosed an example of at least one computer readable medium comprising instructions that, when executed, implement a method or realize an apparatus as described.

There is further disclosed an example of one or more tangible, nontransitory computer-readable storage media comprising instructions to provide a home gateway, the instructions to instruct a processor to: provide a set of security scans for traffic to and from a plurality of devices on a home network; cryptographically verify that a secured device from the plurality of devices provides for itself internal security services; and based on the cryptographic verification, skip at least one security scan of the set of security scans for traffic of the secured device.

There is further disclosed an example, wherein the instructions are further to receive a home gateway certificate from a certificate authority, and use the home gateway certificate in cryptographically verifying that the secured device provides for itself internal security services.

There is further disclosed an example, wherein using the home gateway certificate comprises authenticating the home gateway with the secured device via the home gateway certificate.

There is further disclosed an example, wherein using the home gateway certificate comprises making a provisional secure connection with the secured device, and sending the home gateway certificate via the provisional secure connection.

There is further disclosed an example, wherein the instructions are further to provision a root certificate for the home gateway.

There is further disclosed an example, wherein the instructions are further to provision an endpoint certificate to the secured device, wherein cryptographically verifying comprises authenticating the endpoint certificate against the root certificate.

There is further disclosed an example, wherein cryptographically verifying comprises performing a certificate exchange between the home gateway and the secured device.

There is further disclosed an example, wherein cryptographically verifying comprises receiving an attested security capability report from the secured device, and verifying the attested security capability report.

There is further disclosed an example, wherein cryptographically verifying comprises verifying that the secured device includes a trusted software security agent.

There is further disclosed an example, wherein cryptographically verifying comprises verifying that the secured device includes a minimum operating system version.

There is further disclosed an example, wherein cryptographically verifying comprises verifying that the secured device includes a trusted browser extension.

There is further disclosed an example, further comprising provisioning an endpoint certificate to the secured device via enrollment over secure transport (EST).

There is further disclosed an example, further comprising providing gateway routing via the home gateway.

There is further disclosed an example, further comprising providing wireless access point (WAP) services routing via the home gateway.

There is further disclosed an example of a home gateway, comprising: a hardware platform comprising a processor circuit and a memory; and instructions encoded within the memory to instruct the processor circuit to: provide a set of security scans for traffic to and from a plurality of devices on a home network; cryptographically verify that a secured device from the plurality of devices provides for itself internal security services; and based on the cryptographic verification, skip at least one security scan of the set of security scans for traffic of the secured device.

There is further disclosed an example, wherein the instructions are further to receive a home gateway certificate from a certificate authority, and use the home gateway certificate in cryptographically verifying that the secured device provides for itself internal security services.

There is further disclosed an example, wherein using the home gateway certificate comprises authenticating the home gateway with the secured device via the home gateway certificate.

There is further disclosed an example, wherein using the home gateway certificate comprises making a provisional secure connection with the secured device, and sending the home gateway certificate via the provisional secure connection.

There is further disclosed an example, wherein the instructions are further to provision a root certificate for the home gateway.

There is further disclosed an example, wherein the instructions are further to provision an endpoint certificate to the secured device, wherein cryptographically verifying comprises authenticating the endpoint certificate against the root certificate.

There is further disclosed an example, wherein cryptographically verifying comprises performing a certificate exchange between the home gateway and the secured device.

There is further disclosed an example, wherein cryptographically verifying comprises receiving an attested security capability report from the secured device, and verifying the attested security capability report.

There is further disclosed an example, wherein cryptographically verifying comprises verifying that the secured device includes a trusted software security agent.

There is further disclosed an example, wherein cryptographically verifying comprises verifying that the secured device includes a minimum operating system version.

There is further disclosed an example, wherein cryptographically verifying comprises verifying that the secured device includes a trusted browser extension.

There is further disclosed an example, further comprising provisioning an endpoint certificate to the secured device via enrollment over secure transport (EST).

There is further disclosed an example, further comprising providing gateway routing via the home gateway.

There is further disclosed an example, further comprising providing wireless access point (WAP) services routing via the home gateway.

A system and method of providing secure attestation of endpoint capability will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a home network 100. Home networks such as the home network 100 of this FIGURE are becoming inundated with devices of various types, such as the various endpoints and IoT devices illustrated in this FIGURE, and other similar endpoint and IoT devices. Securing this large number of devices may tax the resources of an already constrained home gateway. It is therefore desirable in some cases to minimize the inspections performed for individual devices, such as by limiting the inspections to DNS only. If this can be done, then much of the workload can be shifted from the gateway to the individual devices that have their own host security agents. To do this, home gateway 108 may determine which devices have an appropriate host security agent, such as an antivirus agent or similar, installed.

As discussed above, in some existing solutions, home gateway 108 may limit its inspection to using DNS queries to determine which devices have an installed security agent. This, however, is spoofable, and can be employed by a malicious entity on the endpoint to mislead home gateway 108 to bypass DPI, or other services for that endpoint.

Furthermore, an evil twin gateway 184 may disrupt services by trying to induce endpoint devices to connect to the evil twin gateway, so that the evil twin gateway can provide access to a malicious entity such as attacker 180.

Evil twin gateway 184 may be a fraudulent WAP with an SSID and password that are the same as those of the user's network. The evil twin appears to the endpoints to be a legitimate WAP, but is set up to eavesdrop on wireless communications, or otherwise launch attacks on the victim device. This can mislead the user, for example, to access phishing sites, to access malware that is not blocked, or to do other things that are beneficial to the attacker 180 but not to user 120.

It is therefore beneficial for endpoints such as client devices 110 and IoT devices 132, 134, 136, 140 to be able to securely attest their security posture to home gateway 108, and to securely authenticate home gateway 108, particularly in the context of a WAP.

In the example of FIG. 1, home network 100 may be an enterprise, a government entity, a data center, a telecommunications provider, a "smart home" with computers, smart phones, and various IoT devices, or any other suitable ecosystem. Home network 100 is provided herein as an illustrative and nonlimiting example of a system that may employ, and benefit from, the teachings of the present specification.

Home network 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within home network 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be a WAP and may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, DPI, web servers, or other services.

In further embodiments, gateway 108 may be a stand-alone internet appliance. Such embodiments are popular in cases in which home network 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within home network 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2A:
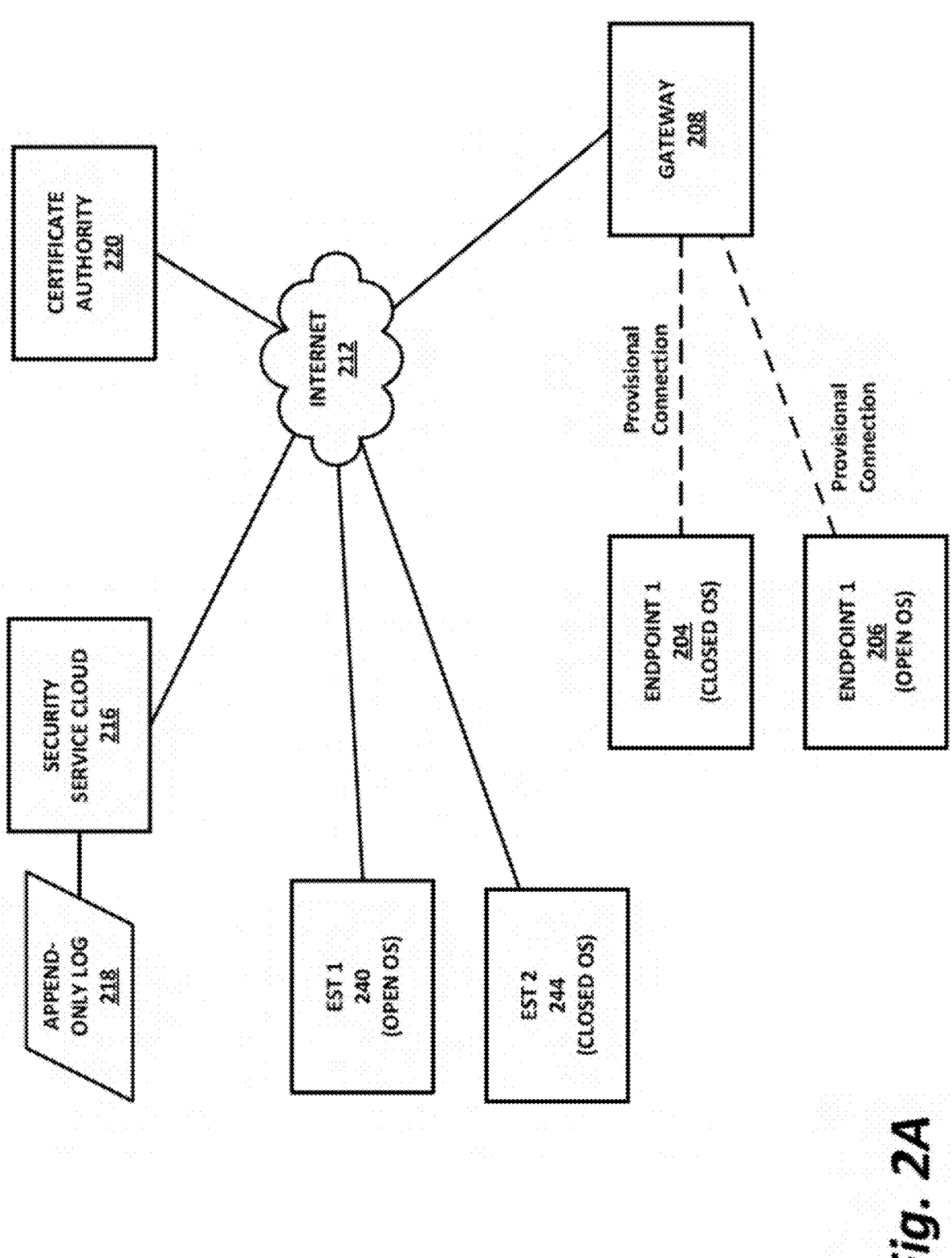
FIGS. 2A-2B are block diagrams of a security ecosystem illustrating partial and full connections.
Figure 2B:
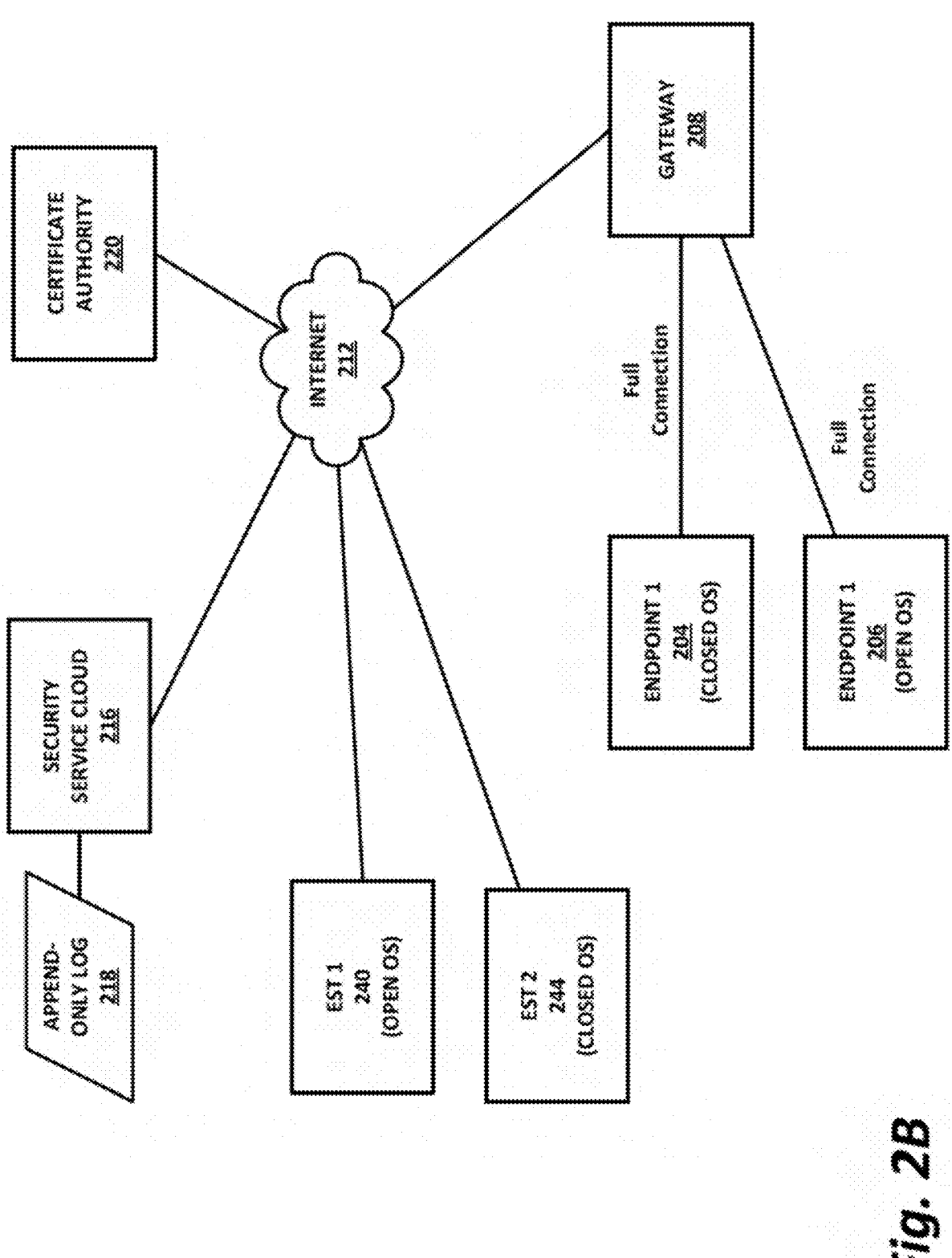

FIGS. 2A-2B are block diagrams of a security ecosystem illustrating partial and full connections. In the case of FIG. 2A, the security ecosystem includes a gateway 208, which may be, for example, a home gateway servicing a home, family, enterprise, individual, or similar. Gateway 208 may be provided with a security engine that provides the operations of the present specification. Similarly, endpoints 204, 206 may also be provided with appropriate endpoint agents.

In this example, gateway 208 provides access to internet 212 to devices within the home network, including, in this example, to endpoint 204 and endpoint 206. In this example, endpoint 204 has a closed operating system, such as Apple iOS or Windows 10 S, while endpoint 206 has an open operating system such as Windows 10, Linux, or Android OS. Note that the use of "open" in this context does not necessarily imply that the operating system is open source, which Windows is not. Rather, the term open in this context refers to the fact that the operating system lacks certain features of a closed OS, such as providing the ability for users to install arbitrary applications, rather than requiring them to install applications via a trusted app store. Furthermore, it is common in a closed OS for each application to run in its own sandbox. This provides some complications to providing security, as a security agent on a closed OS device may not have as great visibility into other apps as one on an open OS device may have.

It may be one object to provide gateway 208 with the ability to craft individual security policies for different endpoints. This can allow gateway 208 to limit the security services performed on flows or packets for certain endpoints, and especially to limit expensive security operations such as DPI. In that case, it is desirable for gateway 208 to be able to securely determine which endpoints have which security capabilities. To this end, endpoints 204, 206 initially connect to gateway 208 with a default security posture, such as one in which gateway 208 performs all available security provisions. However, periodically, or on some stimulus, endpoints 204, 206 may complete an enrollment over secure transport (EST) procedure. In the EST procedure, the endpoints query an EST server, and perform a standard EST operation. In this case, different EST servers may be provided, such as for different operating systems. For example, EST 1 240 may service open OS devices such as endpoint 206, while EST 2 244 may service closed OS devices such as endpoint 204. By way of example, EST 1 240 could be operated by Microsoft Corporation and could service open Windows 10 operating systems, while EST 2 244 could be operated by Apple Inc., and could service closed operating systems such as iOS.

When endpoints 204, 206 complete the EST process, they are provided with a certificate. A private key for this certificate may be stored within a TEE of the endpoint device.

Similarly, gateway 208 may receive a server certificate and a root certificate from certificate authority 220. The server certificate is specific to gateway 208, while the root certificate may be used to authenticate devices within the same domain. After gateway 208 has received its server certificate, the endpoints may store a hash of that certificate, for example, in memory or within the TEE.

Thereafter, when endpoints 204, 206 connect to gateway 208, they initially form a provisional TLS connection. This provisional TLS connection is provided so that the devices can authenticate to one another.

Initially, the devices may exchange certificates, and gateway 208 can authenticate endpoint devices 204, 206 by checking their certificates against the root certificate, or by querying certificate authority 220. On the part of endpoints 204, 206, the devices may check the provided server certificate against the stored hash of the server certificate, to determine that they match. If a connection to certificate authority 220 is also available, endpoints 204, 206 could also query certificate authority 220 to determine that the provided certificate is valid. In some cases, this may be an out of band connection, such as via a 4G LTE or 5G network connection, or some other out of band connection.

Turning to FIG. 2B, once the devices authenticate to one another, the provisional connection can be converted to a full or non-provisional connection. When the authentication is complete, endpoints 204, 206 may be confident that gateway 208 is the legitimate gateway, and not, for example, an evil twin WAP. Furthermore, gateway 208 is confident that the devices are the devices they claim to be.

Endpoints 204, 206 can also self-audit their security posture, such as by operating a security agent with instructions to perform a self-audit. This can include enumerating the operating system, operating system version, installed software, browser in use, installed extensions, installed security agent or agents, or other information about the device's security posture. The security agent can then compile this into a security posture assessment token (SPAT), which the endpoint within its TEE can sign via the private key of the endpoint certificate. Endpoints 204, 206 can then send the signed SPATs to gateway 208, which can validate the SPATs via the public keys of the endpoints' certificates, and then can be confident that the devices have the security posture and capabilities that they claim to have. Based on these reports, gateway 208 can then craft individual security policies or network policies for the endpoints, such as bypassing, limiting, or otherwise customizing certain security services that may be performed on packets or flows for those endpoints.

In some cases, gateway 208 may have endpoints connected to it that do not have a TEE, do not have an installed host security agent, or otherwise lack the ability to perform this secure authentication. In those cases, gateway 208 may treat the devices as untrusted, and for those devices, full security services may be provided. Nevertheless, depending on overall enterprise or family security policy, untrusted devices may still be allowed to connect to the network. They simply receive more security services than trusted devices do.

Figure 3:
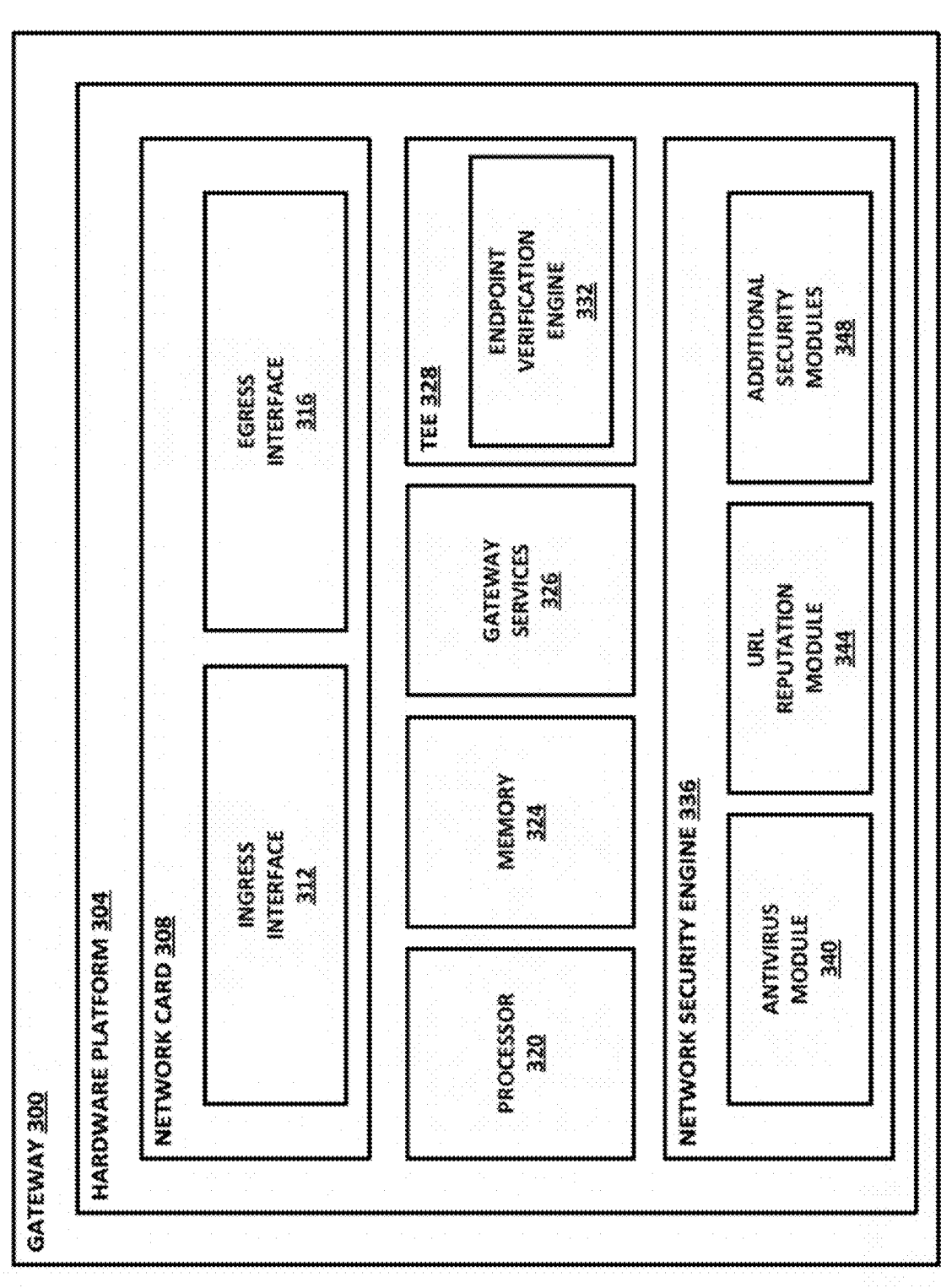
FIG. 3 is a block diagram of a gateway.

FIG. 3 is a block diagram of a gateway 300. Gateway 300 may be a home gateway, including a family gateway, an individual gateway, an enterprise gateway, or any other suitable gateway that provides network services to a home network.

Gateway 300 includes a hardware platform 304, which provides, for example, a processor 320 and memory 324. Gateway 300 also includes a TEE 328, which includes an endpoint verification engine 332. Endpoint verification engine 332 may include instructions stored on one or more transitory or non-transitory computer-readable media that have stored thereon executable instructions that provide the services of endpoint verification engine 332. At runtime, such instructions may be loaded into memory 324, and executed by processor 320. Endpoint verification engine 332 may be used, for example, to verify the cryptographically signed SPATs provided by endpoints. Note that in some embodiments, these services need not be provided within a TEE 328, and thus, in some examples they can be provided in more traditional software.

Gateway 300 also includes, within hardware platform 304, a network card 308, which provides both an ingress interface 312 and an egress interface 316. Network card 308 may provide wired or wireless network services, and may be used to communicatively couple endpoints within the home network out to the broader internet, or to a different network. Note that in connection with network card 308 and the internet services, the hardware platform 304 may also provide gateway services 326. Gateway services 326 could include, for example, switching services, router services, firewall services, port forwarding, network address translation, a recursive DNS resolver, or other similar services.

Gateway 300 also includes a network security engine 336. Network security engine 336 may provide various services. For example, an antivirus module 340 may perform DPI or other antivirus services on network traffic. URL reputation module 344 may communicate with a global URL reputation database (e.g., MCAFEE, LLC's Global Threat Intelligence, or similar), to provide security services based on the reputations of URLs visited by the endpoints. Additional security modules 348 include other security services that may be provided by gateway 300. As described above, it may be beneficial for gateway 300 to operate endpoint verification engine 332 to craft specific network security policies for individual endpoints based on their attested security postures and capabilities.

Figure 4:
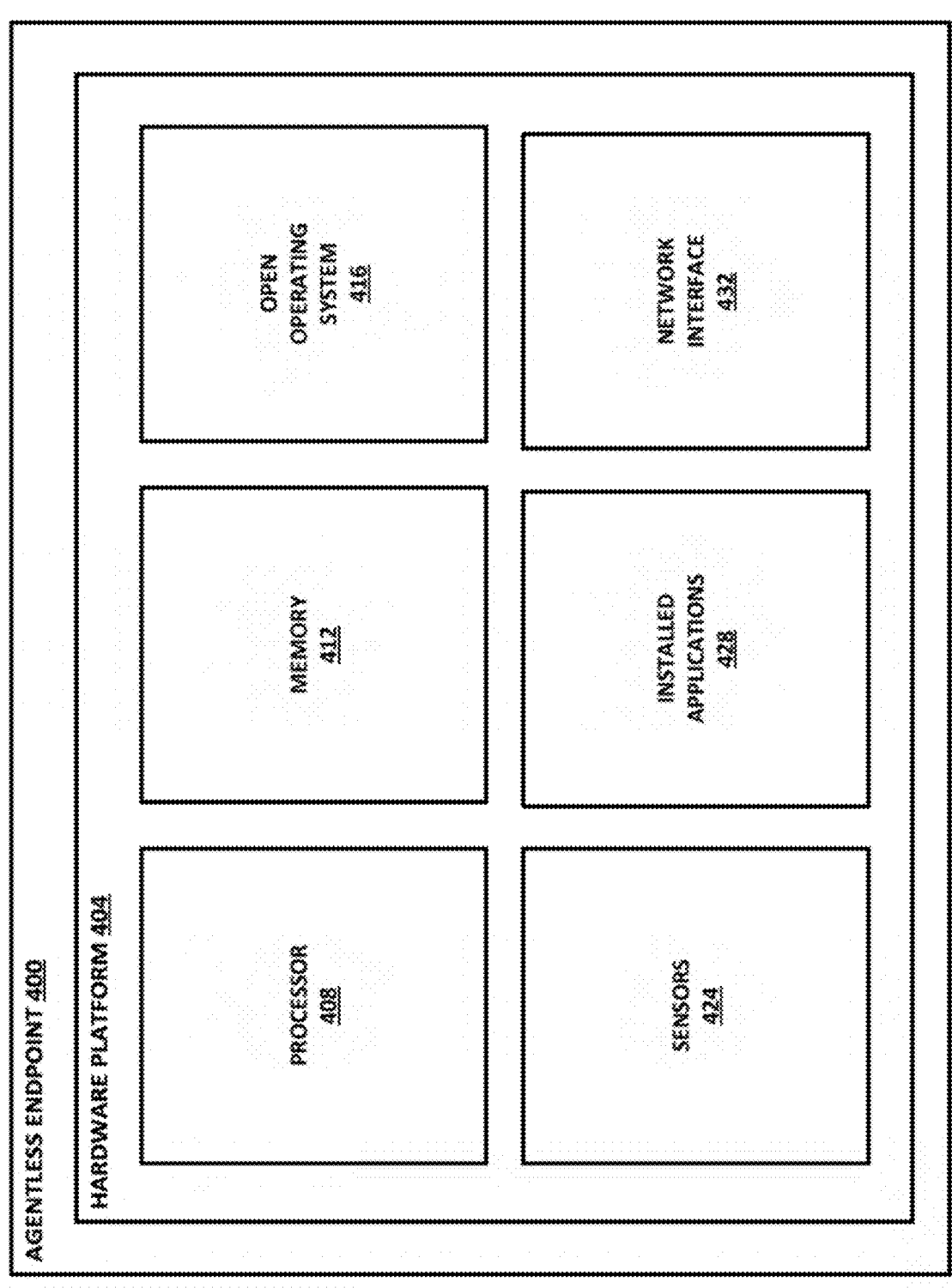
FIG. 4 is a block diagram of an agentless endpoint.

FIG. 4 is a block diagram of an agentless endpoint 400. Agentless endpoint 400 is characterized by its lack of a security agent, and/or by its lack of the ability to securely attest its security posture.

In this example, agentless endpoint 400 includes a hardware platform 404, which may be based, for example, on a processor 408 and a memory 412. Agentless endpoint 400 may also include an open operating system 416, which could alternatively be a closed operating system in various embodiments. Agentless endpoint 400 may also include installed applications 428, which provide the function or services of agentless endpoint 400. Agentless endpoint 400 could be an individual user device, such as a computer, tablet, smart phone, laptop, or similar that uses an open operating system and that cannot securely attest its security posture. Alternatively, agentless endpoint 400 could be an IoT device, in which case it may serve a more specialized function. In the particular case of IoT devices, it is common for agentless endpoint 400 to have sensors 424, or other environmental interfaces that help to provide the specialized function of the agentless endpoint. However, sensors 424 can also be provided on common user-class endpoint devices.

Agentless endpoint 400 includes a network interface 432, which enables agentless endpoint 400 to communicatively couple to the network. Network interface 432 may be a wired or wireless network interface, and could include, for example, Ethernet, Wi-Fi, fiber optics, waveguides, radio frequency (RF), infrared, serial communication, or similar.

Figure 5:
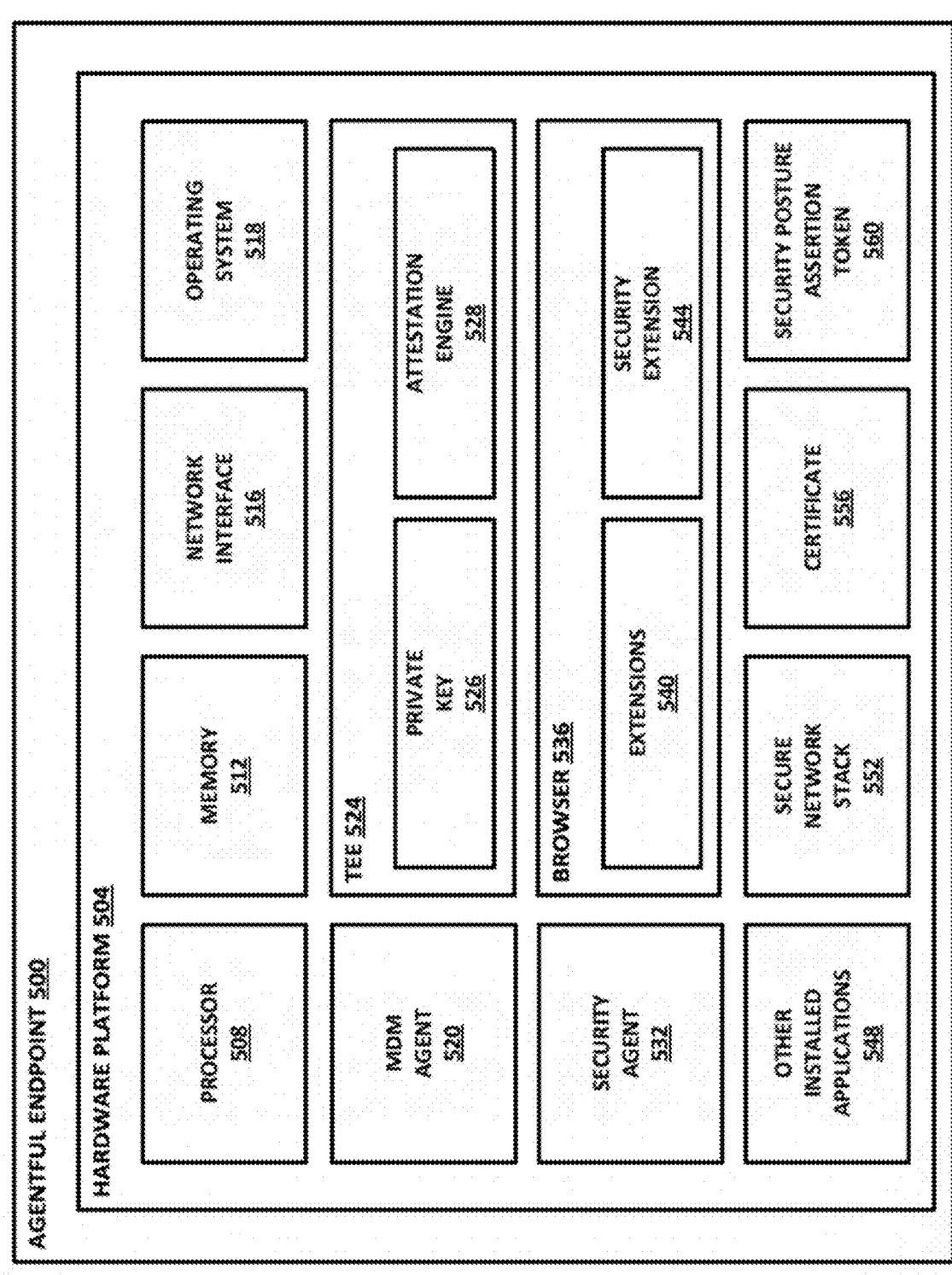
FIG. 5 is a block diagram of an agentful endpoint.

FIG. 5 is a block diagram of an agentful endpoint 500. Agentful endpoint 500 may have capabilities lacked by agentless endpoint 400. For example, agentful endpoint 500 may have a closed operating system, or may have an open operating system with TEE capabilities, as well as the ability to securely attest a security posture.

Agentful endpoint 500 provides the hardware platform 504, including a processor 508 and memory 512. As in other devices, agentful endpoint 500 includes a network interface 516, which enables agentful endpoint 500 to communicatively couple to a network. Agentful endpoint 500 also includes an operating system 518, which in this case could be a closed operating system, although it could be an open operating system, provided agentful endpoint 500 has additional capabilities, such as a TPM, or other provision for allocating a TEE 524.

In some cases, and particularly in the case of a closed operating system, hardware platform 504 may have an MDM agent 520. MDM agent 520 provides the enterprise with complete management and control of agentful endpoint 500. However, in some modern use contexts, users may object to the installation of an MDM agent on their endpoint devices. Thus, in some cases, enterprises and users may wish to omit MDM agent 520.

Hardware platform 504 also includes a host security agent 532. As described above, host security agent 532 may provide certain services such as antivirus, anti-malware, DPI, or other security services to agentful endpoint 500. There are also other installed applications 548.

Agentful endpoint 500 is provisioned with an endpoint certificate 556, which includes a private key 526 and attestation engine 528 that are stored within TEE 524. Agentful endpoint 500 also includes a secure network stack 552, which may be used to provide secure communications via standard protocols, such as secure sockets layer (SSL) or TLS.

Agentful endpoint 500 includes a web browser 536, which includes a plurality of extensions 540. One feature of extensions 540 is that it may be more difficult for security agent 532 to enumerate and otherwise characterize the extensions, as they may not be easily visible outside of browser 536. Thus, in this case, security agent 532 installs security extension 544 into browser 536. This enables security extension 544 to report the installed extensions and their versions, so that they can be characterized in a security posture assessment.

Security agent 532 may enumerate the capabilities of agentful endpoint 500, including its operating system, operating system version, installed applications, browser version, presence of an MDM agent, and other security posture issues. Security extension 544 may report the installed extensions. Security agent 532 may then compile all of this information into security posture assertion token 560. Security posture assertion token 560 may be, for example, a data structure, which could be in a format such as JavaScript object notation (JSON) format. This data structure is then imported into TEE 524 and signed with private key 526. When the signed SPAT is then exported out of TEE 524, it can be cryptographically verified by the home gateway.

Figure 6A:
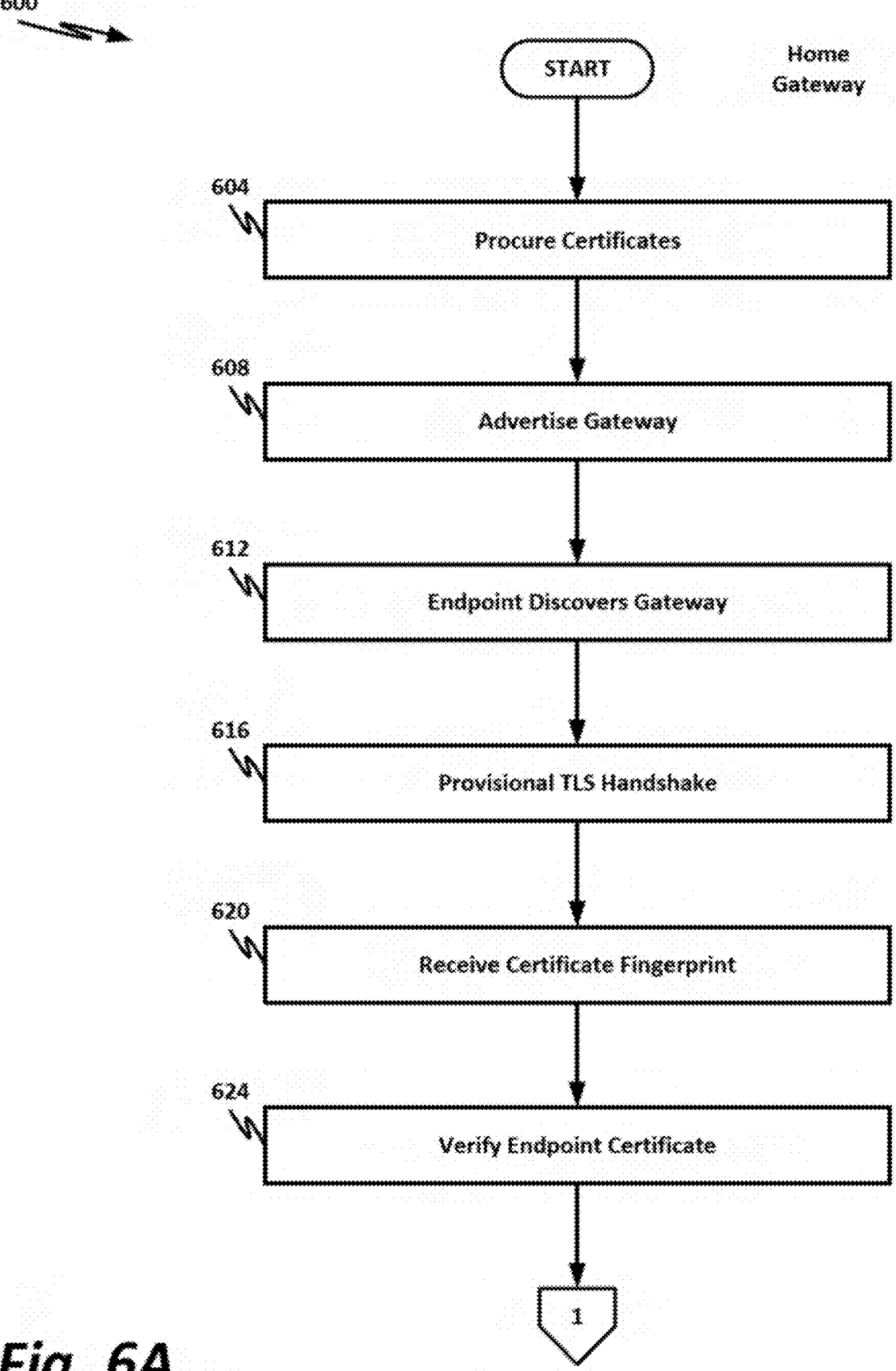
FIGS. 6A-6B are a flowchart of a method that may be performed by a home gateway, or other server type device.
Figure 6B:
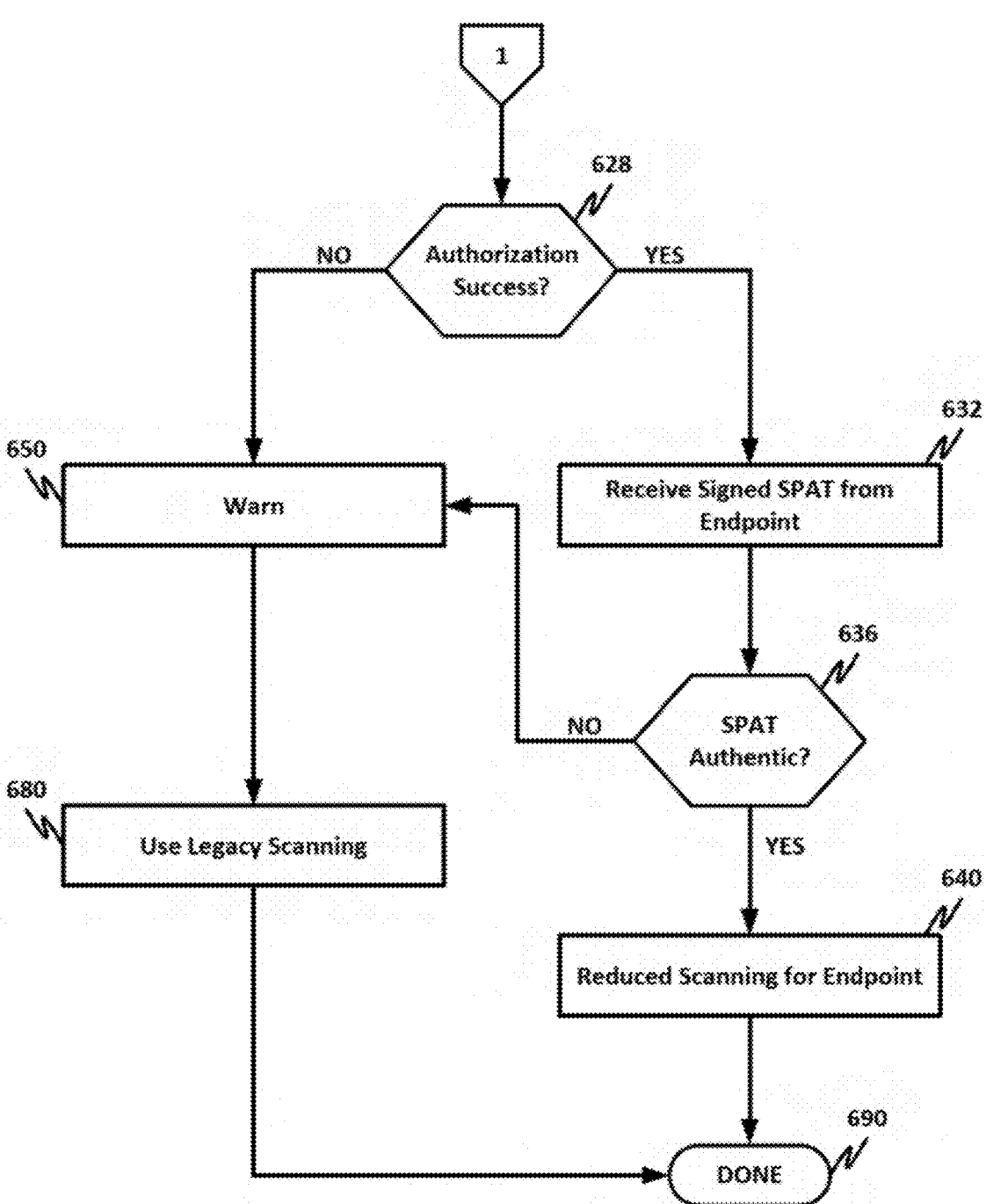

FIGS. 6A-6B are a flowchart of a method 600 that may be performed by a home gateway, or other server type device.

In block 604, the home gateway queries a certificate authority for a server certificate and a root certificate for its domain. The server certificate is used to share with endpoints, to validate the home gateway to those endpoints. The root certificate can be used to check the signature of certificates provided by the endpoints.

In block 608, the home gateway advertises itself, such as by broadcasting its SSID, or otherwise making itself available.

In block 612, an endpoint discovers the gateway, and in block 616, the endpoint and the gateway exchange a provisional TLS handshake. This establishes a provisional TLS connection between the gateway and the endpoint.

In block 620, the home gateway receives the certificate fingerprint, and in block 624 verifies the endpoint certificate and otherwise performs mutual authentication with the endpoint. In this case, a security agent on the endpoint provides the endpoint certificate to the home gateway. The home gateway can verify the endpoint certificate using the already-provisioned root certificate from the EST server, and may optionally additionally check with the EST server to ensure that the certificate is valid. If different endpoints use different EST servers, then the home gateway can write the issued certificates to a centralized, append-only, tamper-proof log like Google Transparency Report. This provides a centralized log for verifying certificates from different EST servers.

Turning to FIG. 6B, in block 628, the home gateway determines whether the authentication of the endpoint was successful.

In block 650, if authentication was not successful, then in block 650, the home gateway may provide a warning in the log. In some cases, it is not beneficial to simply block the connection if there is no successful authentication via a certificate. For example, the endpoint may simply lack the capability to do this. In that case, it may still be beneficial to provide gateway services to less-capable endpoints, such as IoT devices. However, it may make sense to log connections that are made without a secure certificate exchange.

In block 680, because the home gateway was unable to verify that the endpoint has a trusted security agent performing known services, legacy scanning may be enabled for this endpoint. In other words, the home gateway may provide for this endpoint all of its available services, or a subset of services that are selected for the endpoint.

Returning to decision block 628, if authentication was successful, then in block 632, the home gateway receives the SPAT from the endpoint.

In block 636, the system determines whether the SPAT is authentic. If the SPAT is not authentic, then control passes to block 650, and may trigger the use of legacy scanning techniques in block 680. If the SPAT is authentic, then control passes to block 640, enabling reduced scanning for the endpoint.

The home gateway can validate the SPAT token signature based on the attested device information available in the SPAT. The home gateway can then reliably determine if the endpoint has an antivirus agent installed, and can take appropriate action. For example, if the endpoint has an antivirus or other security agent installed, the home gateway cloud can configure the home gateway to do just DNS-based filtering and ignore DPI for that endpoint, or can provide some other service policy. If the endpoint does not have the antivirus agent installed, the home gateway can notify the home administrator to install the antivirus agent on the endpoint, so that limited scanning can be provided by policy for that endpoint.

If the endpoint has one or more bad reputation applications or extensions, the home gateway cloud service can notify the home administrator to uninstall those applications, and until those applications are uninstalled, the endpoint can be isolated.

In block 690, the method is done.

Figure 7:
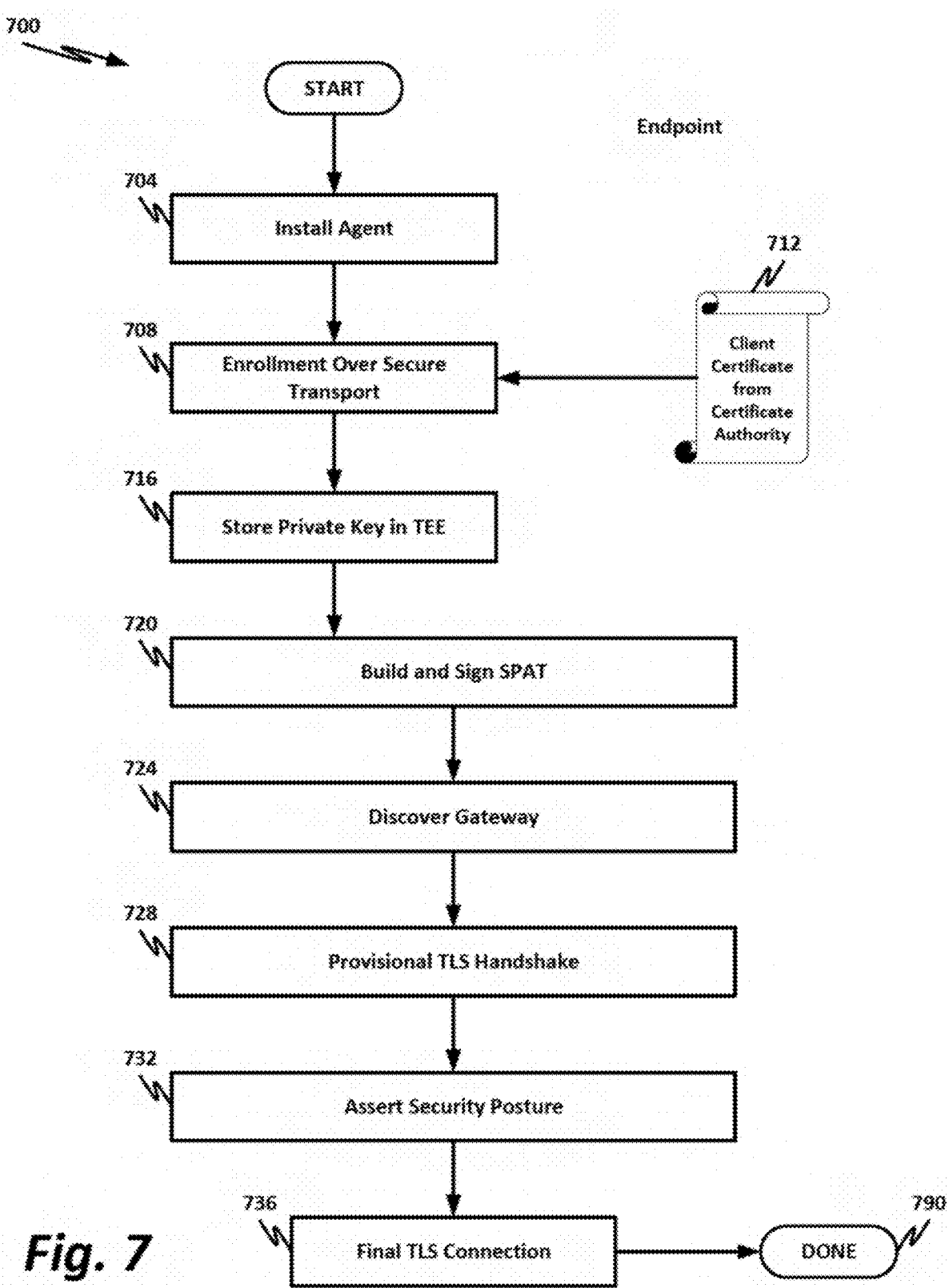
FIG. 7 is a flowchart of a method that may be performed, for example, by an endpoint in an ecosystem.

FIG. 7 is a flowchart of a method 700 that may be performed, for example, by an endpoint in an ecosystem.

Initially, the endpoint may install or have installed thereon an appropriate endpoint security application. This could be installed, for example, from a trusted application store, such as the Microsoft app store, Google's Play store, Apple's App Store, or similar. This could also be installed via an executable object. In the case of a closed OS, such as Apple iOS, Windows 10 S, or similar, the device may install a thin agent from the trusted application store, rather than a full security agent.

In block 704, an onboarding process or installation takes place.

In block 708, while the onboarding or installation procedure is in progress, the security application or thin agent uses EST to get a unique endpoint certificate for the endpoint from certificate authority 712. The certificate may be signed by certificate authority 712, which may be a private certificate authority operated by the security services vendor.

In block 716, the endpoint stores the private key for the certificate in a secure location such as in the TEE. A TEE is an environment that provides strict guarantees against any kind of tampering to the code that is executed, and data used by the code cannot be read or tampered with by any code outside of the TEE.

In block 720, the security agent or thin agent on the endpoint assesses the security posture of the endpoint, periodically or on a stimulus, such as when a new application or extension is installed, or when an existing application or extension is updated. Based on the assessment, the security agent generates a SPAT, which asserts the security posture of the endpoint device. A sample SPAT may include information such as the operating system used, the version, the build number, the last time it was updated, a list of applications, a list of services, a list of browsers installed and extensions installed on those browsers, the versions of the browsers, and when the browsers were updated. The SPAT may also have an expiry affixed to it.

In some cases, the SPAT may be in a structured format, such as JSON or similar. An example SPAT is provided below, by way of illustrative and nonlimiting example. Note that the fields provided here are not required in every SPAT, and that a SPAT could include fields other than those disclosed here:

```
{
    "device":{
    "os":"Windows",
    "version":"10S",
    "build":"burx-apjq-10",
    "last_updated":1443208345,
    "app_list":[
    {
    "name":"app1",
    "identifier":"com.example.app1",
    "version":"1.3.1",
    "last_updated":1443208345
    },
    {
    "name":"app2",
    "identifier":"com.example.app2",
    "version":"2.0.1",
    "last_updated":1443208345
    }
    ]
    "Services_list": ["service1", "service2"]
    "Browsers": [
    {
    "name":"edge",
    "identifier":"com.microsoft.edge",
    "version":"1.3.1",
    "extensions": [
    {
    "name":"extension1",
    "identifier":"com.example.extension1",
    "version":"1.3.1"
    },
    {
    "name":"extension2",
    "identifier":"com.example.extension2",
    "version":"1.3.1"
    }
    ],
    "last_updated":1443208345
    },
    ]
    },
    "exp":1443640345
}
```

Note that the details of extensions installed on the browser may not be available to other applications on the endpoint. Thus, in block 704, the endpoint may in some cases install a lightweight browser extension in addition to the security agent. This browser extension may require minimal permissions, such as chrome.management permissions in Google's Chrome browser. A purpose of these permissions is to get a list of installed extensions and securely communicate the list with the security agent, or the thin agent on the endpoint device.

The security agent or thin agent can then get a corresponding trusted application (TA) to sign the SPAT using the private key stored in the TEE. Note that the trusted application may also be provided by the security services provider, and may be managed by a trusted application manager (TAM).

In block 724, the endpoint discovers the gateway device.

In block 728, the endpoint device performs a provisional TLS handshake with the gateway device. This provides a secure connection between the two devices, but is provisional in the sense that it is not intended to be permanent, and has limited functionality. Specifically, the provisional TLS handshake may enable the endpoint and the gateway to mutually authenticate one another and assert security postures. For example, in block 732, the security agent or thin agent can provide the SPAT to the home gateway using the provisional TLS connection. Using this provisional connection, the security agent or thin agent may receive the home gateway server certificate, and validate it during a mutual authentication operation. On successful validation, the security agent sends its certificate (obtained earlier using EST) to prove its identity to the home gateway.

The mutual authentication may include the security agent or thin agent sending the home gateway's certificate fingerprint to an EST server, to check whether the fingerprint is a valid certificate issued by the certificate authority (CA). Similarly, the home gateway can verify the endpoint certificate using the already-provisioned root certificate from the EST server, and additionally checking with the EST server to ensure its validity. If different products are using different EST servers, then the home gateway can write the issued certificates to a centralized, append-only, tamper-proof log, such as Google Transparency Report, or similar. This log is accessible only to certain products, or to certain parties, such as to products provided by the security services vendor. The point products can use this centralized log for verifying certificates from different EST servers.

Once the mutual authentication is complete, the security agent can send the signed SPAT to the home gateway over the secure TLS connection. In block 736, this allows the endpoint to complete a final TLS connection.

Note that the security agent or thin agent may also store a fingerprint of the home gateway's server certificate, along with the Wi-Fi SSID:BSSID. This fingerprint can also be used to detect an evil twin attack, as described in FIG. 8, below.

In block 790, the method is done.

Figure 8:
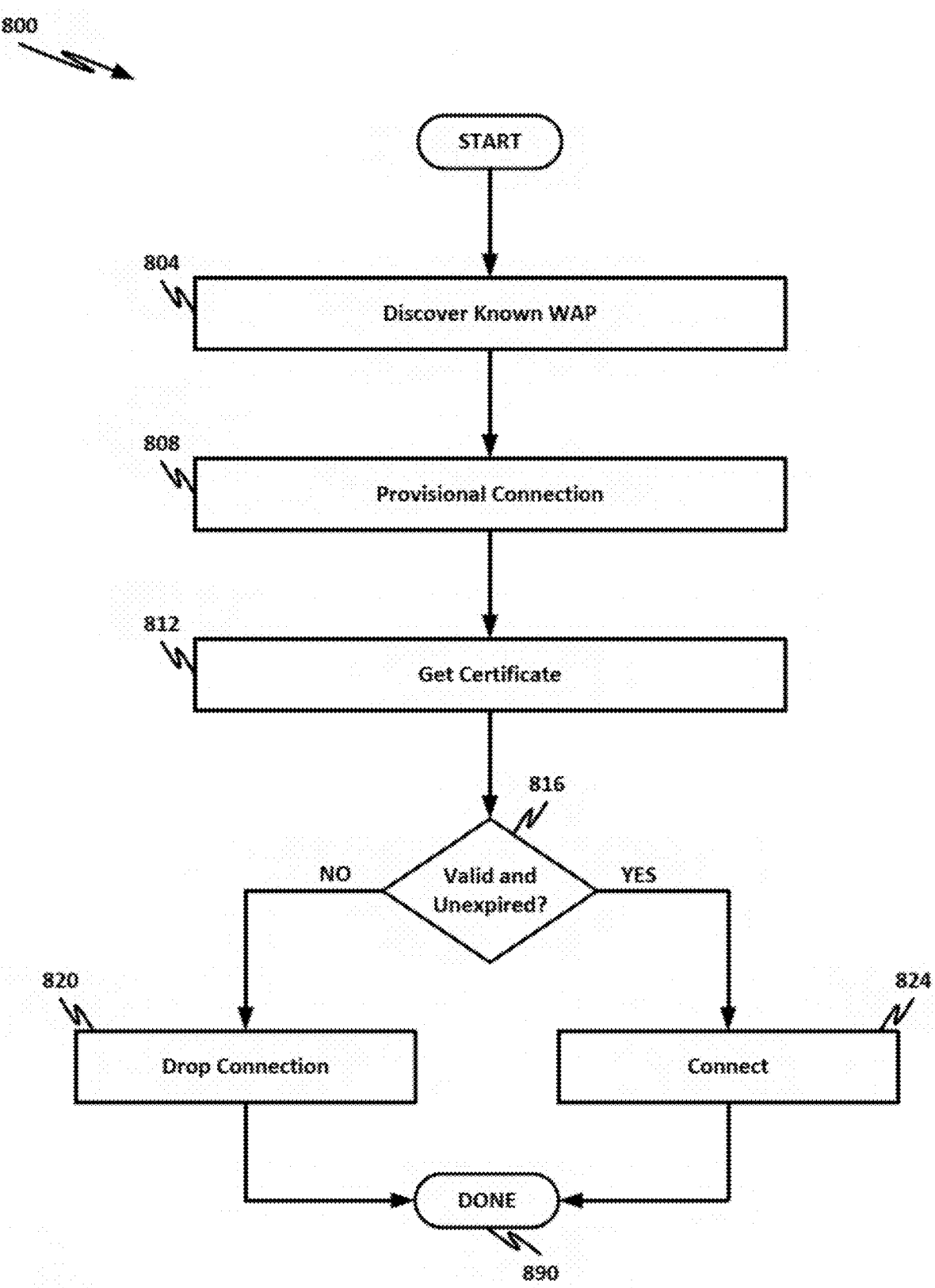
FIG. 8 is a flowchart of a method that may be performed by an endpoint device operating a security agent.

FIG. 8 is a flowchart of a method 800 that may be performed by an endpoint device operating a security agent, and may be used to detect or avoid an evil twin attack.

In block 804, the endpoint discovers a known wireless access point (WAP), identifying it, for example, via its SSID or BSSID.

In block 808, the endpoint makes a provisional connection with the WAP. As discussed above, the security agent may have stored a fingerprint of the home gateway's server certificate, along with the Wi-Fi SSID:BSSID. When the endpoint connects to the same network, the discovery and provisional TLS handshake steps described in connection with FIG. 7 may be repeated.

In block 812, the security agent or thin agent on the endpoint matches the certificate to the one that it previously stored from the home gateway.

In block 816, the endpoint determines whether the certificate is valid and unexpired. The validity of the certificate may be based on whether a fingerprint of the newly provided certificate matches the fingerprint of the previously provided certificate. The certificate may also have a time to live, and if that time to live has expired, then the home gateway should have procured a new certificate. Thus, if a new certificate has been provided, it may not mean that this is an evil twin, but rather that the certificate expired and that a new certificate has been provided. Thus, if the time to live of the server certificate of the home gateway has expired, then the endpoint may also need to check with the EST server to determine whether the new certificate is a validly issued new certificate. In some cases, if the endpoint does not know the time to live for the old certificate, it may also need to check with the EST server to determine whether the old fingerprint is still valid (i.e., not expired or revoked). Note that in the case of revocation, the revocation of the certificate may not be based on expiration, but on some other event that caused the certificate to be revoked. Thus, it is beneficial to check with the EST server, even when the certificate has not expired.

If an out of band communication method is available, it may be advantageous to use the out of band method to check with the EST server. For example, if the endpoint device is a cell phone or a tablet computer that has both a Wi-Fi and a cellular data connection, the cellular data connection may be used to validate the home gateway before the connection is made. If such an out of band connection is not available, the provisional connection to the home gateway may be used. This may require the endpoint to validate the EST server itself, to ensure that an evil twin home gateway has not redirected it to its own server, masquerading as the EST server. This can be done using traditional SSL or TLS technology, and in some cases, a certificate provided by the EST server itself may be compared to a certificate previously stored on the endpoint. This can ensure that an evil twin gateway cannot hijack the EST connection to provide a false authentication of the home gateway.

Returning to decision block 816, if the certificate provided is not valid and unexpired, then in block 820, the connection is dropped.

On the other hand, if the certificate is valid and unexpired, then in block 824, the connection is completed.

In block 890, the method is done.

The methods disclosed in FIGS. 6-8 can provide security services for both closed OS devices such as PCs running Windows 10 S, Chromebooks, Apple iOS devices, or similar, and for devices running traditional "open" operating systems like Windows 10, Android, or Linux. Furthermore, the methods described herein also help to minimize inspection overhead on the home gateway. For closed OS devices with a good security posture, the home gateway can do just DNS-based filtering and skip other inspection engines, or can craft some other customized policy. For a traditional OS device with an appropriate security agent installed, the home gateway and the security agent of the endpoint can cooperate to provide better security for the endpoint.

This solution also applies to closed OS, BYOD devices in an enterprise network. Employees may typically see MDM software applications on their personal devices as a privacy threat and wish to avoid them. In the absence of MDM software, enterprise administrators lose visibility into important device details like the OS and its version, installed applications and extensions, and others. Furthermore, having to install MDM software on a personal device is challenging for contract workers or consultants who may work for multiple organizations, or for sales professionals who must visit different organizations regularly.

The teachings of the present specification provide an enterprise administrator with visibility into security postures of closed OS devices, without having to install an MDM application. This solution can be extended to enable closed OS BYOD devices to cryptographically attest their security posture to enterprise-hosted network security services.

The enterprise can ask closed OS BYOD device users to install a provided thin agent from a trusted application store. This thin agent is non-privacy-intrusive, and only gathers a list of installed applications. This may require, for example, package query permission on Windows 10 S, or similar permissions on other operating systems. The user may also install a browser extension using, for example, a thin browser extension. The thin agent can be provisioned with the enterprise specific profile to enable connection to an enterprise wireless network. The thin agent may use EST to get a unique endpoint certificate signed by the CA of the security services provider, or by a different CA. The private key for the certificate is stored in the TEE. The thin agent can then periodically, or on events such as install, uninstall, or update, generate a SPAT and get the corresponding trusted application to sign the SPAT using cryptographic keys provisioned earlier using EST. Upon connecting to the enterprise network, the thin agent sends the signed SPAT token to an enterprise security management platform, such as a policy orchestrator.

Once the enterprise security management platform receives a SPAT token, it cryptographically verifies the token, and then derives the security posture of the device from the assertions specified by the token. Based on the derived security posture, the enterprise security management platform may decide on possible policies to be enforced for the device. For example, based on the assertion, the BYOD device may be allowed to connect to the enterprise network. In some cases, the enterprise can notify the user in case a bad reputation application or extension was found on the device, and can suggest uninstalling it. Similarly, the token can be used to determine whether the BYOD device can be allowed to access internal resources like Confluence, Jira, GitHub, Teams, or others. Furthermore, based on the security posture, the administrator can specify higher or lower reauthentication timeouts for resources being accessed via the device. The security posture can also be used to determine whether the BYOD device can be allowed to access local enterprise services, such as printers or other devices.

Figure 9:
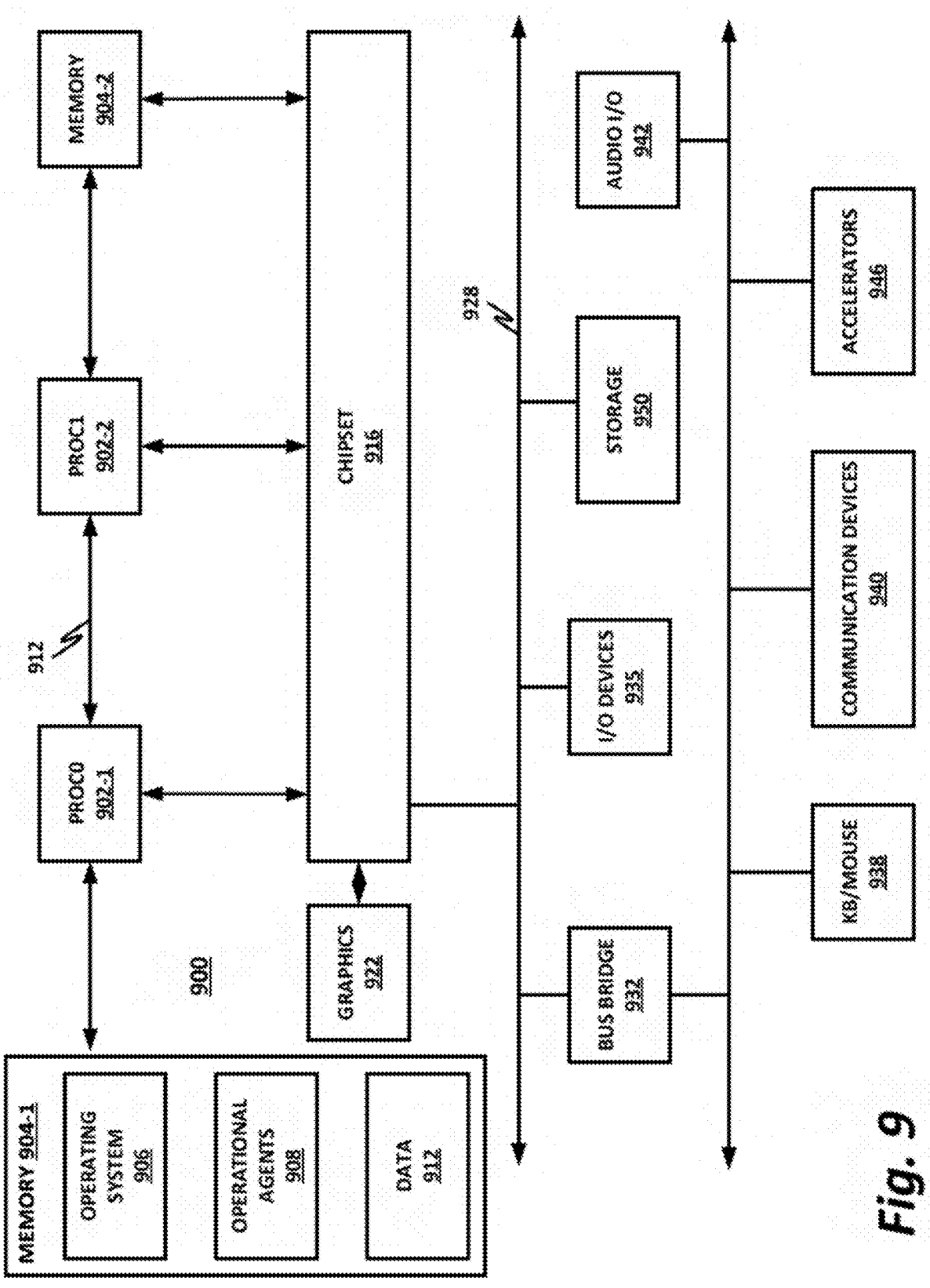
FIG. 9 is a block diagram of selected elements of a hardware platform.

FIG. 9 is a block diagram of a hardware platform 900. In at least some embodiments, hardware platform 900 may be programmed, configured, or otherwise adapted to provide reputation clusters for uniform resource locators, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for PC and server type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more central processor units (CPUs).

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, ROM, flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency, non-volatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, RF, or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in ASICs, FPGAs, and other semiconductor chips.

Figure 10:
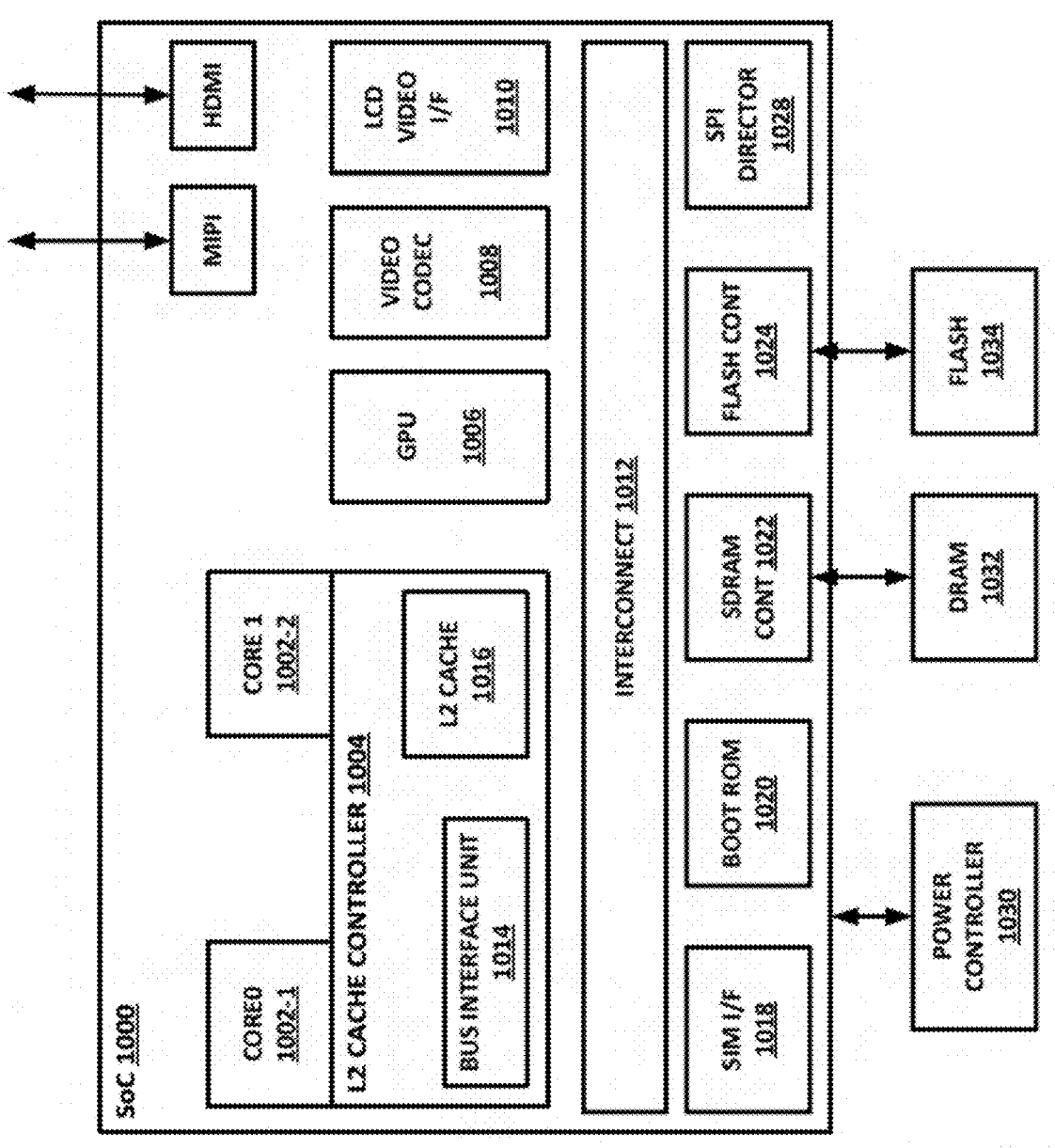
FIG. 10 is a block diagram of selected elements of a system-on-a-chip (SoC).

FIG. 10 is a block illustrating selected elements of an example SoC 1000. In at least some embodiments, SoC 1000 may be programmed, configured, or otherwise adapted to provide reputation clusters for uniform resource locators, according to the teachings of the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google *Nexus*, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016.

Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) director 1028, a suitable power control 1030, a dynamic RAM (DRAM) 1032, and flash 1034. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1000 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 11:
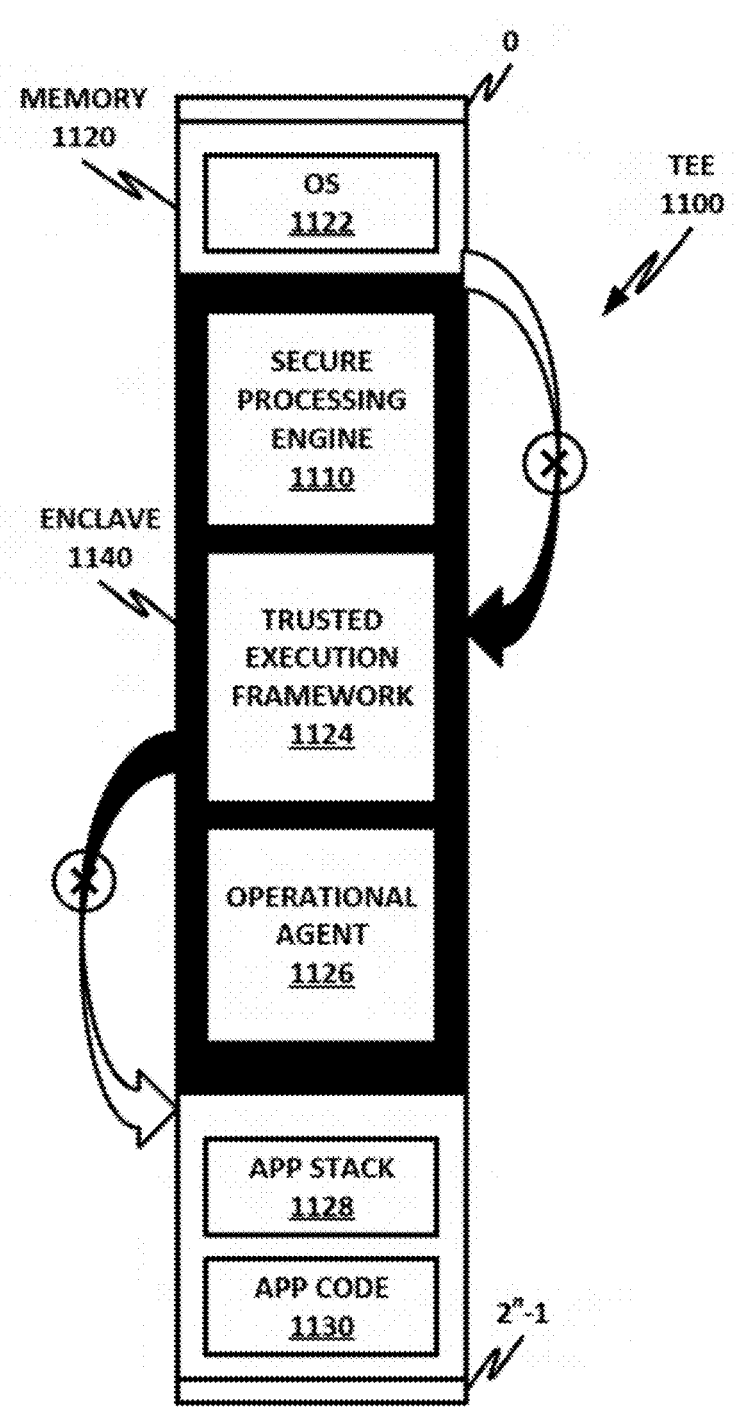
FIG. 11 is a block diagram of selected elements of a trusted execution environment (TEE).

FIG. 11 is a block diagram of a trusted execution environment (TEE) 1100. FIG. 11 illustrates a platform for providing a TEE. One or more features of the present specification may be provided within a TEE, according to embodiments of the present specification.

In the example of FIG. 11, memory 1120 is addressable by n-bits, ranging in address from 0 to $2^n-1$ (note, however, that in many cases, the size of the address space may far exceed the actual memory available). Within memory 1120 is an OS 1122, enclave 1140, application stack 1120, and application code 1130.

In this example, enclave 1140 is a specially-designated portion of memory 1120 that cannot be entered into or exited from except via special instructions, such as Intel Software Guard Extensions (SGX) or similar. Enclave 1140 is provided as an example of a secure environment which, in conjunction with a secure processing engine 1110, forms a TEE 1100 on a hardware platform such as platform 900 of FIG. 9. A TEE 1100 is a combination of hardware, software, and/or memory allocation that provides the ability to securely execute instructions without interference from outside processes, in a verifiable way. By way of example, TEE 1100 may include memory enclave 1140 or some other protected memory area, and a secure processing engine 1110, which includes hardware, software, and instructions for accessing and operating on enclave 1140. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1110 may be a user-mode application that operates via trusted execution framework 1124 within enclave 1140. TEE 1100 may also conceptually include processor instructions that secure processing engine 1110 and trusted execution framework 1124 require to operate within enclave 1140.

Secure processing engine 1110 and trusted execution framework 1124 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1122 may be excluded from TCB, in addition to the regular application stack 1128 and application code 1130.

In certain systems, computing devices equipped with Intel SGX or equivalent instructions may be capable of providing an enclave 1140. It should be noted, however, that many other examples of TEEs are available, and TEE 1100 is provided only as one example thereof. Other secure environments may include, by way of nonlimiting example, a virtual machine, sandbox, testbed, test machine, or other similar device or method for providing a TEE 1100.

In an example, enclave 1140 provides a protected memory area that cannot be accessed or manipulated by ordinary computer instructions. Enclave 1140 is described with particular reference to an Intel SGX enclave by way of example, but it is intended that enclave 1140 encompass any secure processing area with suitable properties, regardless of whether it is called an "enclave."

One feature of an enclave is that once an enclave region 1140 of memory 1120 is defined, as illustrated, a program pointer cannot enter or exit enclave 1140 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1140.

Thus, once enclave 1140 is defined in memory 904, a program executing within enclave 1140 may be safely verified to not operate outside of its bounds. This security feature means that secure processing engine 1110 is verifiably local to enclave 1140. Thus, when an untrusted packet provides its content to be rendered with trusted execution framework 1124 of enclave 1140, the result of the rendering is verified as secure.

Enclave 1140 may also digitally sign its output, which provides a verifiable means of ensuring that content has not been tampered with or modified since being rendered by secure processing engine 1110. A digital signature provided by enclave 1140 is unique to enclave 1140 and is unique to the hardware of the device hosting enclave 1140.

Figure 12:
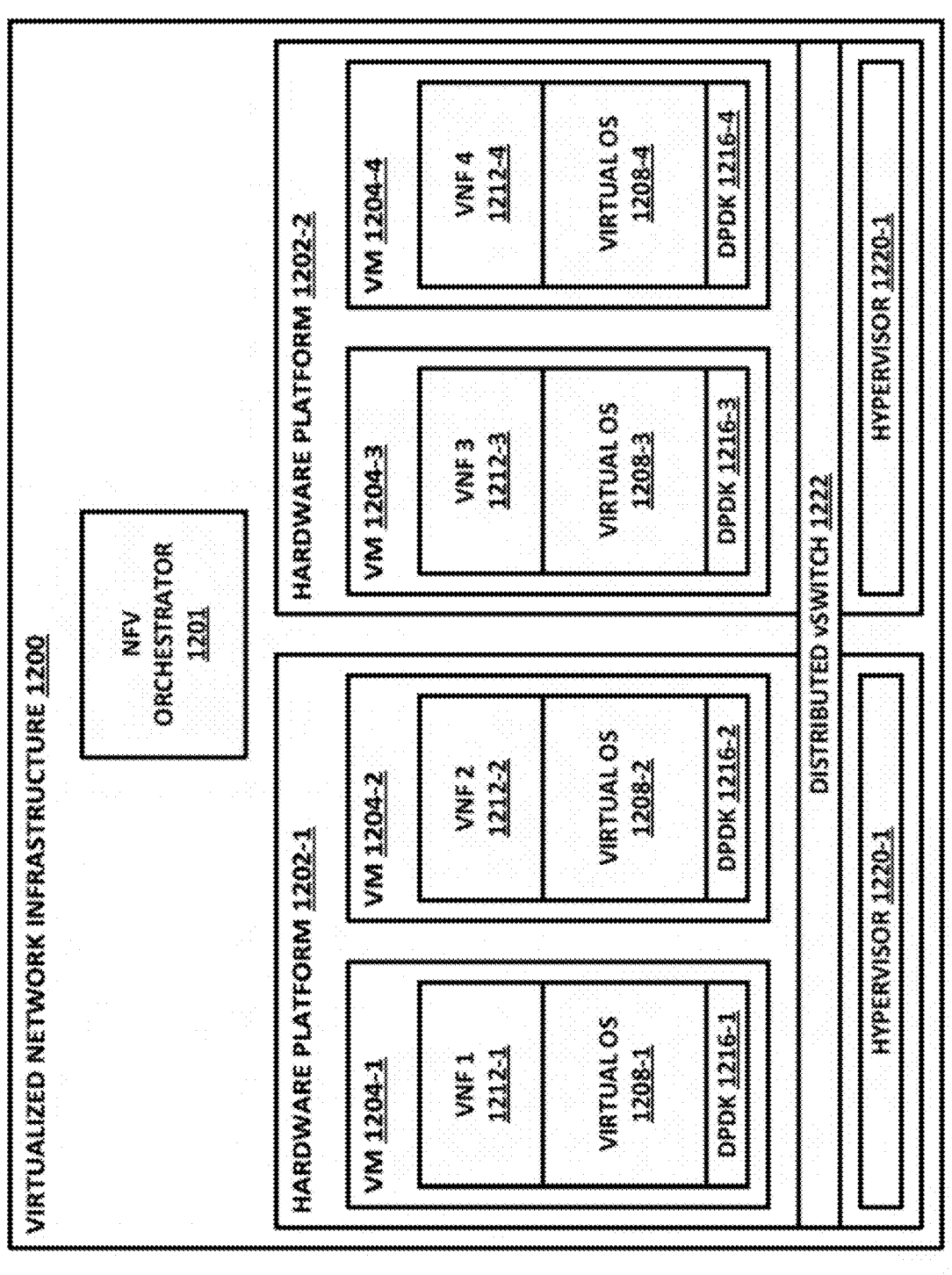
FIG. 12 is a block diagram of selected elements of a network function virtualization (NFV) infrastructure.

FIG. 12 is a block diagram of a network function virtualization (NFV) infrastructure 1200. FIG. 12 illustrates a platform for providing virtualization services. Virtualization may be used in some embodiments to provide one or more features of the present disclosure.

NFV is an aspect of network virtualization that is generally considered distinct from, but that can still interoperate with, a software defined network (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or DPI appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1200. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 12, an NFV orchestrator 1201 manages a number of the VNFs 1212 running on an NFVI 1200. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1201 a valuable system resource. Note that NFV orchestrator 1201 may provide a browser-based or graphical configuration interface, and in some embodiments may be integrated with SDN orchestration functions.

Note that NFV orchestrator 1201 itself may be virtualized (rather than a special-purpose hardware appliance). NFV orchestrator 1201 may be integrated within an existing SDN system, wherein an operations support system (OSS) manages the SDN. This may interact with cloud resource management systems (e.g., OpenStack) to provide NFV orchestration. An NFVI 1200 may include the hardware, software, and other infrastructure to enable VNFs to run. This may include a hardware platform 1202 on which one or more VMs 1204 may run. For example, hardware platform 1202-1 in this example runs VMs 1204-1 and 1204-2. Hardware platform 1202-2 runs VMs 1204-3 and 1204-4. Each hardware platform may include a hypervisor 1220, virtual machine manager (VMM), or similar function, which may include and run on a native (bare metal) operating system, which may be minimal so as to consume very few resources.

Hardware platforms 1202 may be or comprise a rack or several racks of blade or slot servers (including, e.g., processors, memory, and storage), one or more data centers, other hardware resources distributed across one or more geographic locations, hardware switches, or network interfaces. An NFVI 1200 may also include the software architecture that enables hypervisors to run and be managed by NFV orchestrator 1201.

Running on NFVI 1200 are a number of VMs 1204, each of which in this example is a VNF providing a virtual service appliance. Each VM 1204 in this example includes an instance of the Data Plane Development Kit (DPDK), a virtual operating system 1208, and an application providing the VNF 1212.

Virtualized network functions could include, as nonlimiting and illustrative examples, firewalls, intrusion detection systems, load balancers, routers, session border controllers, DPI services, network address translation (NAT) modules, or call security association.

The illustration of FIG. 12 shows that a number of VNFs 1204 have been provisioned and exist within NFVI 1200. This FIGURE does not necessarily illustrate any relationship between the VNFs and the larger network, or the packet flows that NFVI 1200 may employ.

The illustrated DPDK instances 1216 provide a set of highly-optimized libraries for communicating across a virtual switch (vSwitch) 1222. Like VMs 1204, vSwitch 1222 is provisioned and allocated by a hypervisor 1220. The hypervisor uses a network interface to connect the hardware platform to the data center fabric. This fabric may be shared by all VMs 1204 running on a hardware platform 1202. Thus, a vSwitch may be allocated to switch traffic between VMs 1204. The vSwitch may be a pure software vSwitch (e.g., a shared memory vSwitch), which may be optimized so that data are not moved between memory locations, but rather, the data may stay in one place, and pointers may be passed between VMs 1204 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1222 is illustrated, wherein vSwitch 1222 is shared between two or more physical hardware platforms 1202.

Figure 13:
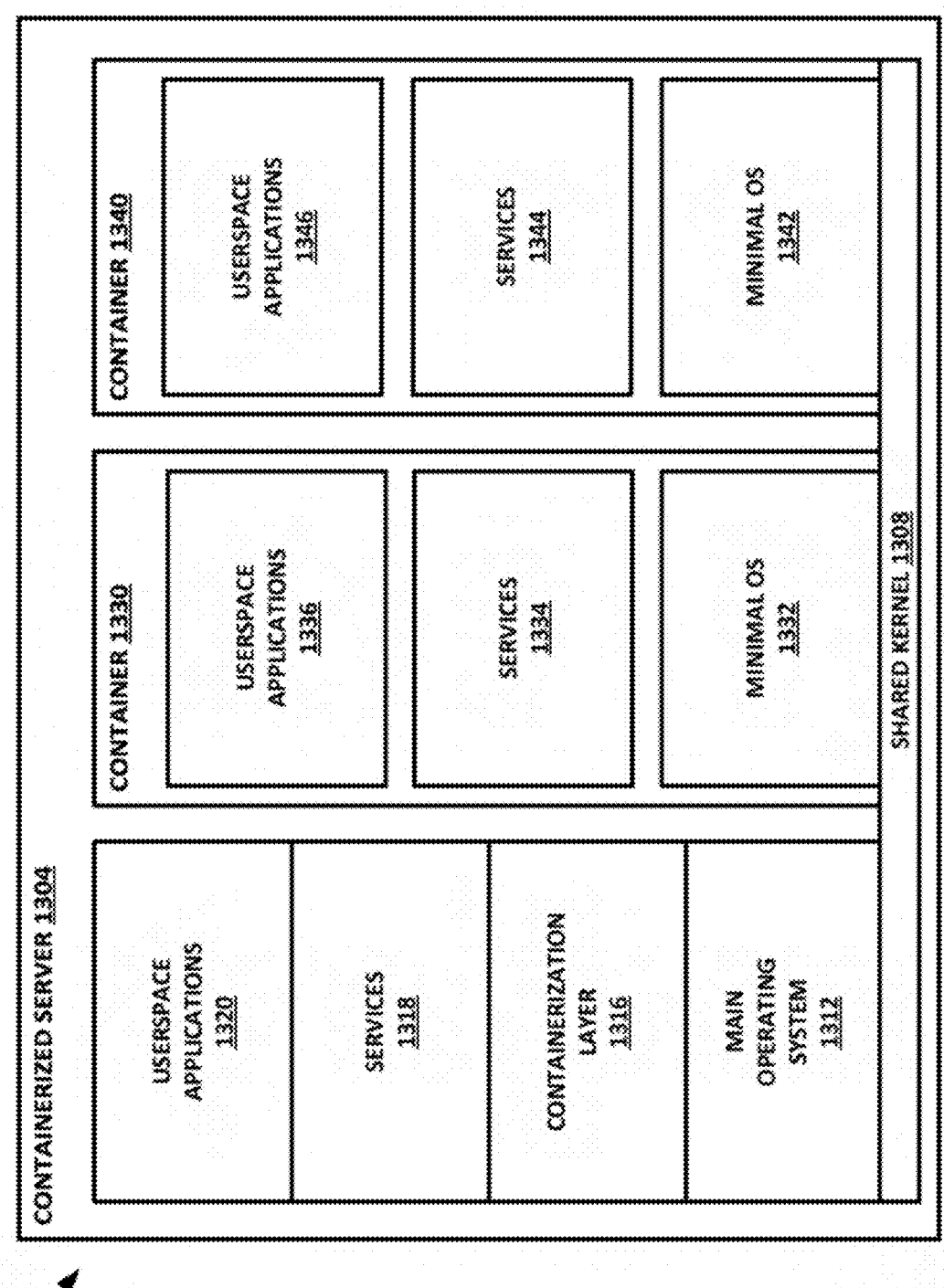
FIG. 13 is a block diagram of selected elements of a containerization infrastructure.

FIG. 13 is a block diagram of selected elements of a containerization infrastructure 1300. FIG. 13 illustrates a platform for providing containerization services. Containerization may be used in some embodiments to provide one or more features of the present disclosure. Like virtualization, containerization is a popular form of providing a guest infrastructure.

Containerization infrastructure 1300 runs on a hardware platform such as containerized server 1304. Containerized server 1304 may provide a number of processors, memory, one or more network interfaces, accelerators, and/or other hardware resources.

Running on containerized server 1304 is a shared kernel 1308. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1308 is main operating system 1312. Commonly, main operating system 1312 is a Unix or Linux-based operating system, although containerization infrastructure is also available for other types of systems, including Microsoft Windows systems and Macintosh systems. Running on top of main operating system 1312 is a containerization layer 1316. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1312 may also include a number of services 1318, which provide services and interprocess communication to userspace applications 1320.

Services 1318 and userspace applications 1320 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1312, they inherit the same file and resource access permissions as those provided by shared kernel 1308. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1304, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e., containerized server 1304).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors-especially type 1, or "bare metal," hypervisors-provide such near-native performance that this advantage may not always be realized.

In this example, containerized server 1304 hosts two containers, namely container 1330 and container 1340.

Container 1330 may include a minimal operating system 1332 that runs on top of shared kernel 1308. Note that a minimal operating system is provided as an illustrative example, and is not mandatory. In fact, container 1330 may perform as full an operating system as is necessary or desirable. Minimal operating system 1332 is used here as an example simply to illustrate that in common practice, the minimal operating system necessary to support the function of the container (which in common practice, is a single or monolithic function) is provided.

On top of minimal operating system 1332, container 1330 may provide one or more services 1334. Finally, on top of services 1334, container 1330 may also provide a number of userspace applications 1336, as necessary.

Container 1340 may include a minimal operating system 1342 that runs on top of shared kernel 1308. Note that a minimal operating system is provided as an illustrative example, and is not mandatory. In fact, container 1340 may perform as full an operating system as is necessary or desirable. Minimal operating system 1342 is used here as an example simply to illustrate that in common practice, the minimal operating system necessary to support the function of the container (which in common practice, is a single or monolithic function) is provided.

On top of minimal operating system 1342, container 1340 may provide one or more services 1344. Finally, on top of services 1344, container 1340 may also provide a number of userspace applications 1346, as necessary.

Using containerization layer 1316, containerized server 1304 may run a number of discrete containers, each one providing the minimal operating system and/or services necessary to provide a particular function. For example, containerized server 1304 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and an NVM. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or runtime memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile RAM (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A method of providing services on a consumer home gateway, comprising:

providing a set of security scans for traffic to and from a plurality of devices on a consumer home network;

for a first class of devices, comprising one or more devices that do not cryptographically attest a security posture, providing the full set of security scans;

for a second class of devices, comprising one or more devices that do cryptographically attest a security posture that includes satisfactory device-local security services, skipping at least one security scan of the set of security scans.

2. The method of claim 1, further comprising receiving a home gateway certificate from a certificate authority, and using the home gateway certificate in cryptographically verifying that the secured device provides for itself internal security services.

3. The method of claim 2, wherein using the home gateway certificate comprises authenticating the home gateway with the secured device via the home gateway certificate.

4. The method of claim 2, wherein using the home gateway certificate comprises making a provisional secure connection with the secured device, and sending the home gateway certificate via the provisional secure connection.

5. The method of claim 1, further comprising provisioning a root certificate for the home gateway.

6. The method of claim 5, further comprising provisioning an endpoint certificate to the secured device, wherein cryptographically verifying comprises authenticating the endpoint certificate against the root certificate.

7. The method of claim 1, wherein cryptographically verifying comprises performing a certificate exchange between the home gateway and the secured device.

8. The method of claim 1, wherein cryptographically verifying comprises receiving an attested security capability report from the secured device, and verifying the attested security capability report.

9. The method of claim 1, wherein cryptographically verifying comprises verifying that the secured device includes a trusted software security agent.

10. The method of claim 1, wherein cryptographically verifying comprises verifying that the secured device includes a minimum operating system version.

11. The method of claim 1, wherein cryptographically verifying comprises verifying that the secured device includes a trusted browser extension.

12. The method of claim 1, further comprising provisioning an endpoint certificate to the secured device via enrollment over secure transport (EST).

13. The method of claim 1, further comprising providing gateway routing via the home gateway.

14. The method of claim 1, further comprising providing wireless access point (WAP) services routing via the home gateway.

15. One or more tangible, nontransitory computer-readable storage media comprising instructions to provide a home gateway, the instructions to instruct a processor to:

provide a set of security scans for traffic to and from a plurality of devices on a consumer home network;

for a first class of devices, comprising one or more devices that do not cryptographically attest a security posture, provide the full set of security scans;

for a second class of devices, comprising one or more devices that do cryptographically attest a security posture that includes satisfactory device-local security services, skip at least one security scan of the set of security scans for traffic of the secured device.

16. The one or more tangible, nontransitory computer-readable storage media of claim 15, wherein the instructions are further to receive a home gateway certificate from a certificate authority, and use the home gateway certificate in cryptographically verifying that the secured device provides for itself internal security services.

17. The one or more tangible, nontransitory computer-readable storage media of claim 16, wherein using the home gateway certificate comprises authenticating the home gateway with the secured device via the home gateway certificate.

18. The one or more tangible, nontransitory computer-readable storage media of claim 16, wherein using the home gateway certificate comprises making a provisional secure connection with the secured device, and sending the home gateway certificate via the provisional secure connection.

19. A home gateway, comprising:

a hardware platform comprising a processor circuit and a memory; and instructions encoded within the memory to instruct the processor circuit to:

provide a set of security scans for traffic to and from a plurality of devices on a consumer home network;

for a first class of devices, comprising one or more devices that do not cryptographically attest a security posture, provide the full set of security scans;

for a second class of devices, comprising one or more devices that do cryptographically attest a security posture that includes satisfactory device-local security services, skip at least one security scan of the set of security scans for traffic of the secured device.

20. The home gateway of claim 19, wherein the instructions are further to receive a home gateway certificate from a certificate authority, and use the home gateway certificate in cryptographically verifying that the secured device provides for itself internal security services.

* * * * *